(12) United States Patent
Du et al.

(10) Patent No.: US 11,881,553 B1
(45) Date of Patent: Jan. 23, 2024

(54) DENDRITE SUPPRESSING SOLID ELECTROLYTE STRUCTURES AND RELATED METHODS AND SYSTEMS

(71) Applicant: Ampcera Inc., Milpitas, CA (US)

(72) Inventors: Hui Du, Tucson, AZ (US); James Emery Brown, Tucson, AZ (US); Chen Chen, Tucson, AZ (US); Sumin Zhu, San Franscisco, CA (US)

(73) Assignee: Ampcera Inc., Milpitas, CA (US)

( * ) Notice: Subject to any disclaimer, the term of this patent is extended or adjusted under 35 U.S.C. 154(b) by 244 days.

(21) Appl. No.: 17/030,249

(22) Filed: Sep. 23, 2020

Related U.S. Application Data

(60) Provisional application No. 62/904,134, filed on Sep. 23, 2019.

(51) Int. Cl.
*H01M 10/0562* (2010.01)

(52) U.S. Cl.
CPC ............... *H01M 10/0562* (2013.01); *H01M 2300/0068* (2013.01); *H01M 2300/0094* (2013.01)

(58) Field of Classification Search
CPC ..... H01M 10/0562; H01M 2300/0068; H01M 2300/0094
See application file for complete search history.

(56) References Cited

U.S. PATENT DOCUMENTS

| | | | |
|---|---|---|---|
| 8,455,137 B2 * | 6/2013 | Benson | H01M 10/058 429/188 |
| 9,472,808 B2 | 10/2016 | Engel et al. | |
| 10,047,451 B2 | 8/2018 | Gaben et al. | |
| 10,347,937 B2 | 7/2019 | Beck et al. | |
| 10,700,377 B2 | 6/2020 | Thomas-Alyea et al. | |
| 10,770,769 B2 | 9/2020 | Aetukuri et al. | |
| 2003/0015431 A1 * | 1/2003 | Barker | H01M 4/8885 204/252 |
| 2009/0065042 A1 * | 3/2009 | Reynolds | H01L 31/053 29/623.5 |
| 2009/0239041 A1 | 9/2009 | Yura et al. | |
| 2010/0323118 A1 | 12/2010 | Mohanty et al. | |
| 2013/0337309 A1 * | 12/2013 | Virkar | H01M 10/3909 429/104 |
| 2015/0118572 A1 * | 4/2015 | Lund | H01M 4/362 429/231.95 |
| 2016/0240896 A1 * | 8/2016 | Zhang | H01M 10/0569 |
| 2016/0351973 A1 | 12/2016 | Albano et al. | |
| 2017/0279155 A1 * | 9/2017 | Sun | H01M 4/366 |
| 2017/0301958 A1 | 10/2017 | Deng | |
| 2018/0166741 A1 * | 6/2018 | Xu | H01M 10/052 |
| 2018/0277826 A1 | 9/2018 | Gayden | |
| 2018/0301751 A1 | 10/2018 | Sakamoto et al. | |
| 2019/0177238 A1 | 6/2019 | Yi | |
| 2019/0214672 A1 | 7/2019 | Chang et al. | |

(Continued)

OTHER PUBLICATIONS

D. Tejero-Martin, Beyond Traditional Coatings: A Review on Thermal-Sprayed Functional and Smart Coatings, Journal of Thermal Spray Technology vol. 28, pp. 598-644, 2019.

(Continued)

*Primary Examiner* — Matthew J Merkling
(74) *Attorney, Agent, or Firm* — Walters & Wasylyna LLC

(57) ABSTRACT

A solid-state electrolyte membrane includes an interlocking layered microstructure formed by melting and spraying of ionic conductive material for use in a battery system.

20 Claims, 26 Drawing Sheets

(56) References Cited

U.S. PATENT DOCUMENTS

2019/0280330 A1     9/2019  Albano
2020/0176810 A1*    6/2020  Ogata ................. H01M 10/058
2020/0365903 A1*   11/2020  Ogata ................. H01M 10/058

OTHER PUBLICATIONS

Fuming Du, All solid state lithium batteries based on lamellar garnet-type ceramic electrolytes, Journal of Power Sources, 300, 24-28, 2015.
Eongyu Yi, Flame made nanoparticles permit processing of dense, flexible, Li+ conducting ceramic electrolyte thin films of cubic-Li7La3Zr2O12 (c-LLZO) (1), Journal of Materials Chemistry A, 2016,4, 12947-12954.

* cited by examiner

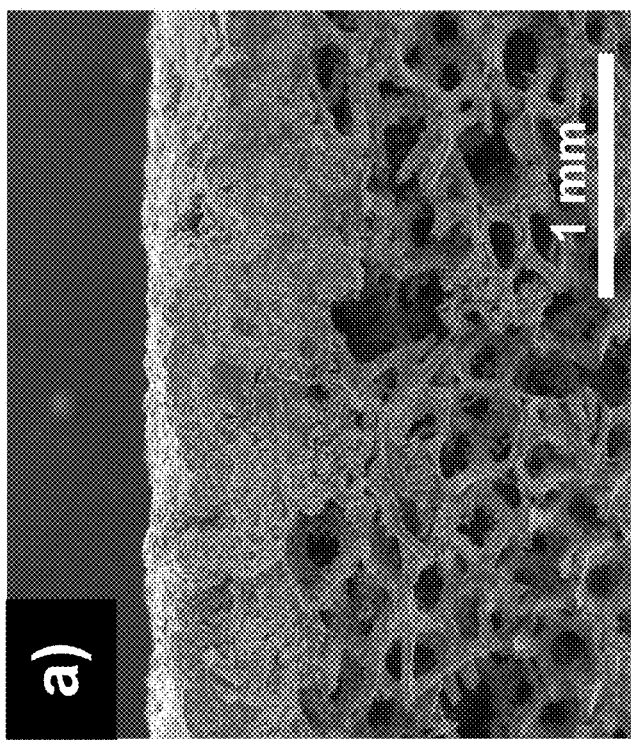
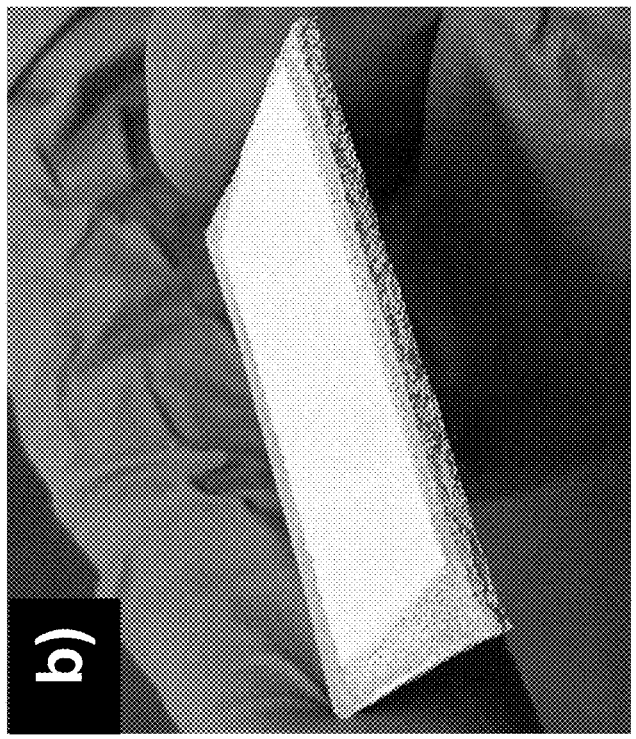
FIG. 5B
FIG. 5A

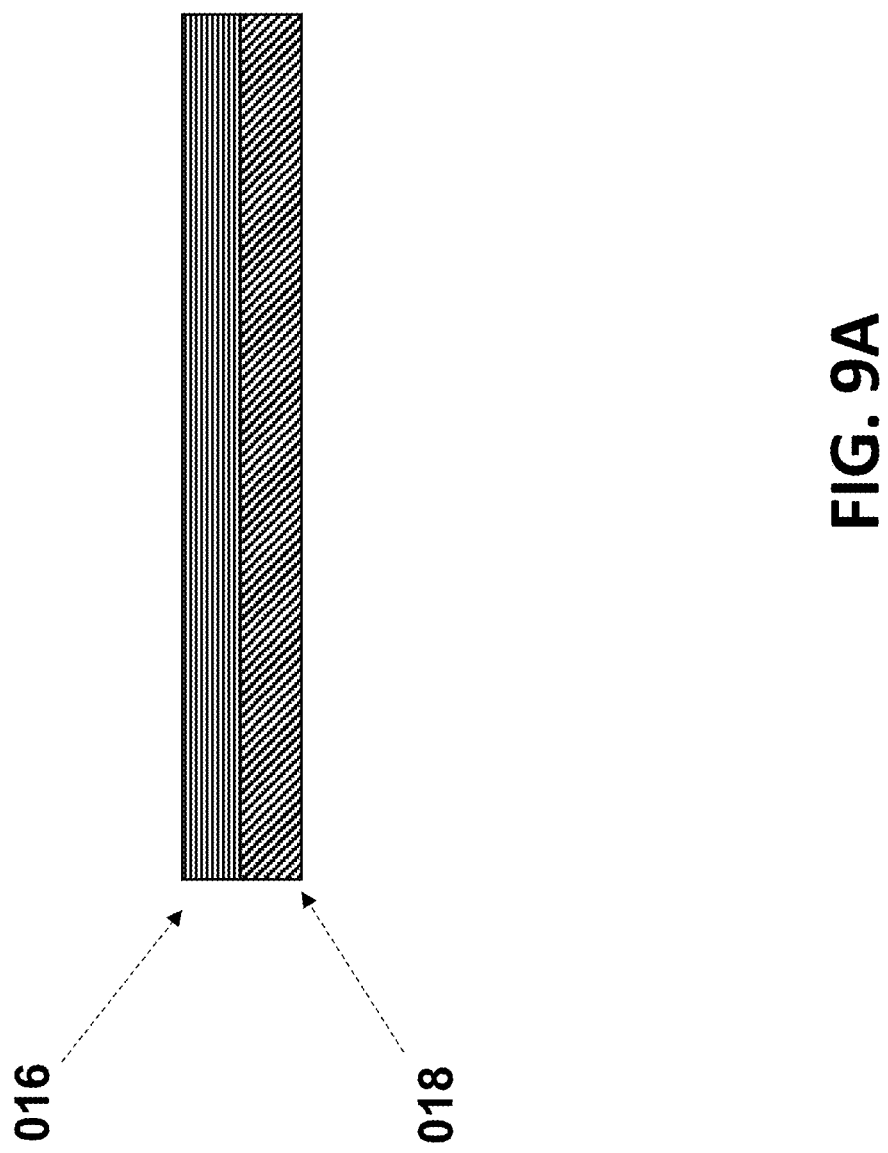

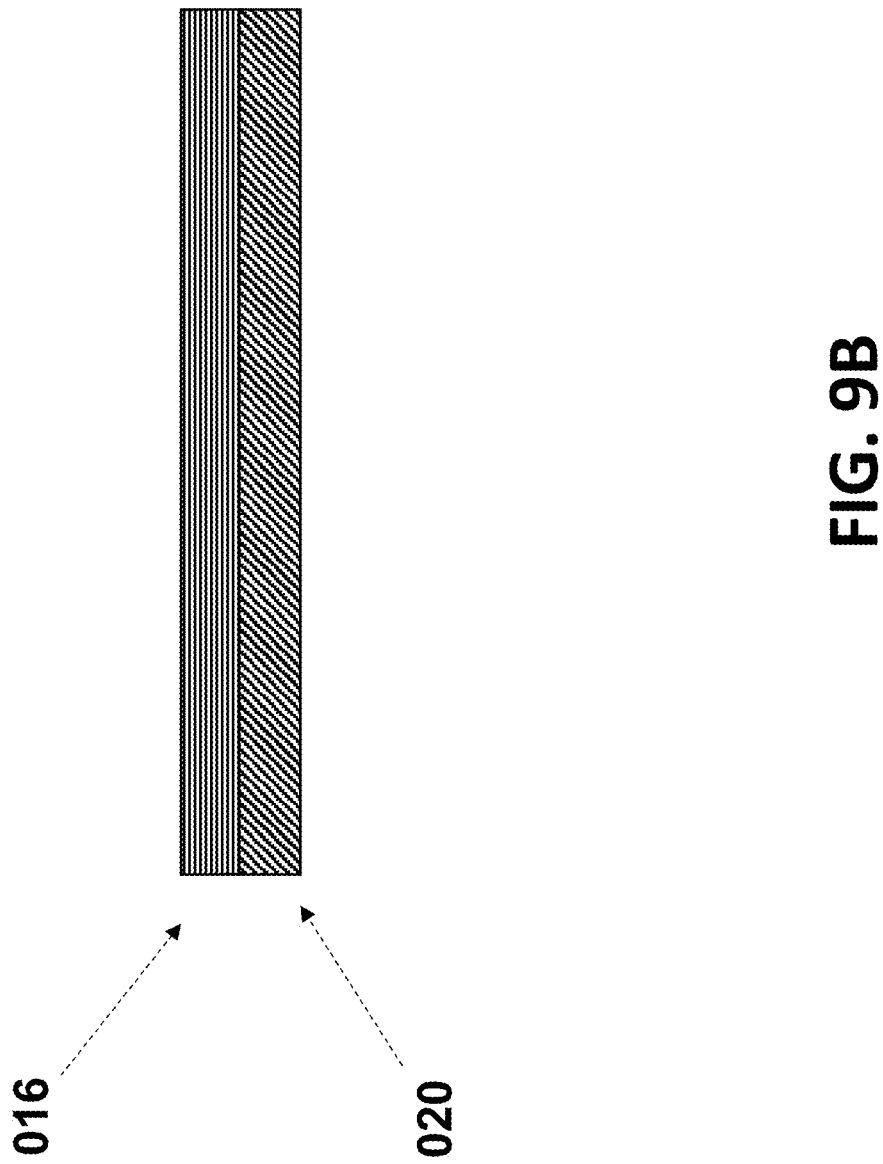

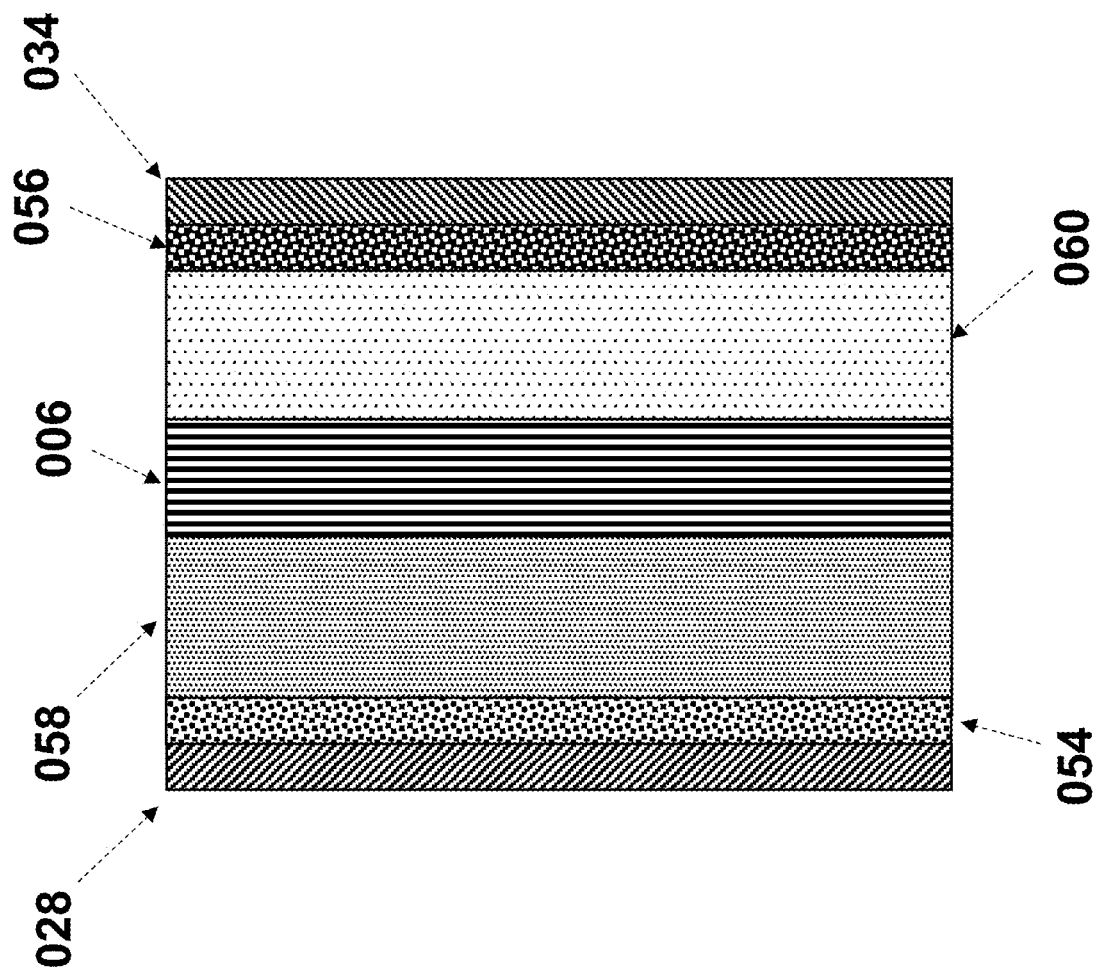

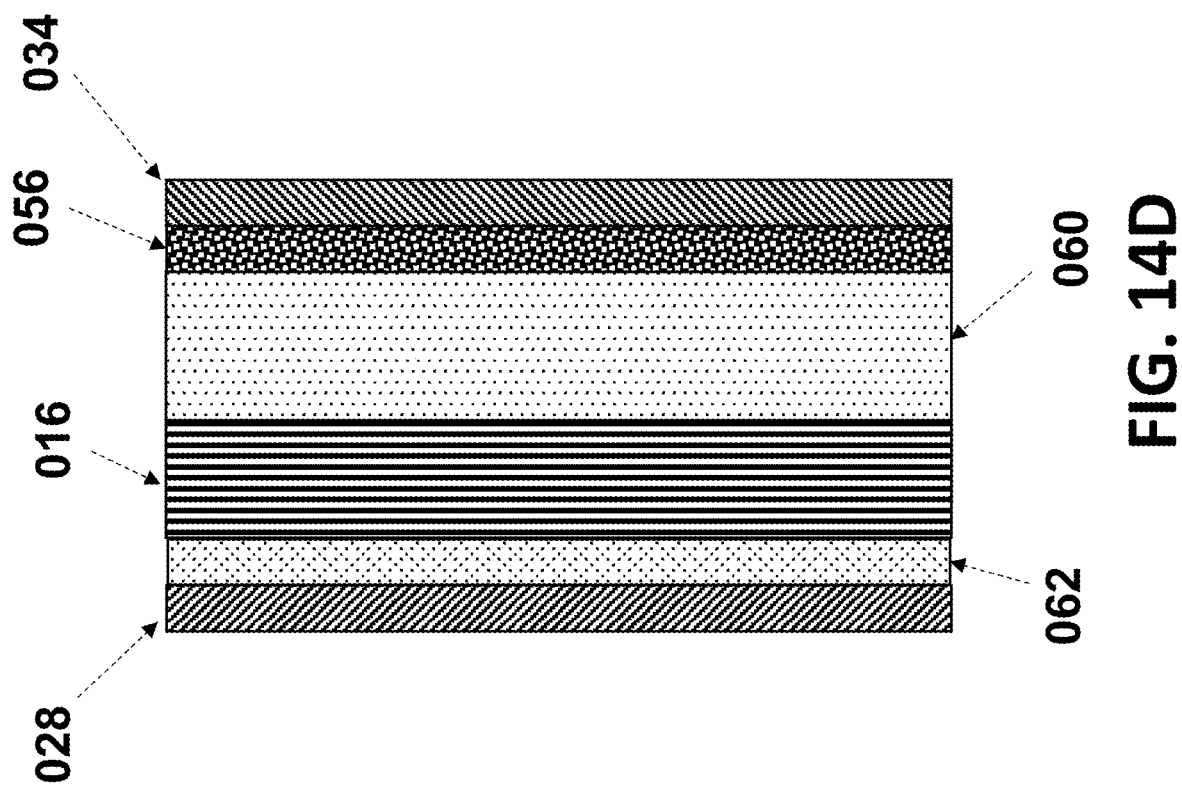

ial Patent Application No. 62/904,134, filed Sep. 23, 2019, which is incorporated herein by reference in its entirety.

DENDRITE SUPPRESSING SOLID ELECTROLYTE STRUCTURES AND RELATED METHODS AND SYSTEMS

PRIORITY

The present application claims the priority of U.S. Provisional Patent Application No. 62/904,134, filed Sep. 23, 2019, which is incorporated herein by reference in its entirety.

FIELD

The present application relates to the field of solid electrolyte structures.

BACKGROUND

Solid-state ionic conductive membranes offer a safe alternative to liquid electrolytes in lithium batteries and related technologies. However, conventionally sintered ceramic solid-state electrolyte have grain structure in the form of close packed hexagons. These grain boundaries are usually charged with electrons or act as fast electron conductive channels. And they are oriented randomly always having a vector partially parallel to the applied electrical field. When ions pass through, they can be reduced forming metal dendrites along the grain boundaries causing through-membrane shorting leading to battery failure.

Accordingly, those skilled in the art continue with research and development in the field of solid electrolyte structures.

SUMMARY

In one embodiment, a solid-state electrolyte membrane includes an interlocking layered microstructure formed by melting and spraying of ionic conductive material for use in a battery system. In an aspect, layered grain boundaries may block the migration of electrons across the membrane suppressing metal dendrite formation in the presence of an electric field. In an aspect, the interlocking layered structure may be composed of at least one of a garnet-structure oxide material, a NASICON-structured material, a perovskite type oxide material, an anti-perovskite-type oxide material, a thiophosphate material, and a argyrodite structured sulfide. In an aspect, the interlocking layered microstructure may be coated with a layer to at least one of increase wetting, increase stability, reduce impedance, increase catalytic activity. In an aspect, a battery electrode may be formed onto the surface thereof. In an aspect, the interlocking layered microstructure may be formed onto a porous substrate, and the porous substrate may be infiltrated, or decorated with, an electrode material. In an aspect, the interlocking layered microstructure may be formed onto a porous substrate for use as a separation or extraction membrane.

In another embodiment, a battery includes an anode, a cathode, and the solid-state electrolyte membrane between the anode and the cathode. In an aspect, the cathode may interact with ions through an intercalation mechanism, a non-intercalation mechanism, or a combination thereof. In an aspect, the anode may interact with ions through an intercalation mechanism, a non-intercalation mechanism, or a combination thereof. In an aspect, the battery may be a liquid, gel polymer, all-solid-state, semi-solid-state, a hybrid system, or a combination thereof, that contains the solid-state electrolyte membrane. In an aspect, the battery may be a primary or secondary battery that comprises the solid-state electrolyte membrane as an ionic conducting separator. In an aspect, the battery may be a flow-type secondary battery, wherein the solid-state electrolyte membrane is used as an ionic conducting membrane. In an aspect, the battery may be an anodeless battery, wherein the solid-state electrolyte membrane may be formed onto a current collector of the anodeless battery system.

In another embodiment, a method for fabricating a solid electrolyte structure includes melting and spraying of ionic conductive material on a substrate. In an aspect, the ionic conductive material may be formed onto a removable substrate, which may be removed leaving behind a freestanding solid electrolyte structure. In an aspect, the ionic conductive material may be formed onto a flat or non-planar substrate which may be electronically conductive or electronically insulative but coated with an electronically conductive layer. In an aspect, the ionic conductive material may be formed onto a flat or non-planar substrate which may also be ionically conductive. In an aspect, the ionic conductive material may be formed onto a flat or non-planar porous supporting substrate which may be electronically conductive or electronically insulative but coated with an electronically conductive layer. In an aspect, the ionic conductive material may be formed onto a battery electrode.

Other aspects of the disclosed embodiments will become apparent from the following detailed description, the accompanying drawings and the appended claims.

BRIEF DESCRIPTION OF THE DRAWINGS

FIG. 5A: A cross-sectional scanning electron microscopy image of an interlocking layered membrane according to the present description on a porous substrate.

FIG. 5B: A tilted plane view digital image of an interlocking layered membrane according to the present description on a porous supporting structure.

FIG. 9A: A schematic illustration of an interlocking layered membrane formed onto a flat surface according to the present description.

FIG. 9B: A schematic illustration of an interlocking layered membrane formed onto a flat surface according to the present description.

FIG. 14A: A schematic illustration of a flow type secondary battery including an interlocking layered membrane according to the present description, wherein the ionic conductive membrane is a freestanding interlocking layered membrane.

FIG. 14D: A schematic illustration of a flow type secondary battery includes an interlocking layered membrane, according to the present description wherein the ionic conductive membrane is formed onto a preformed battery electrode.

DETAILED DESCRIPTION

Figures 1A, 1B, 1C:
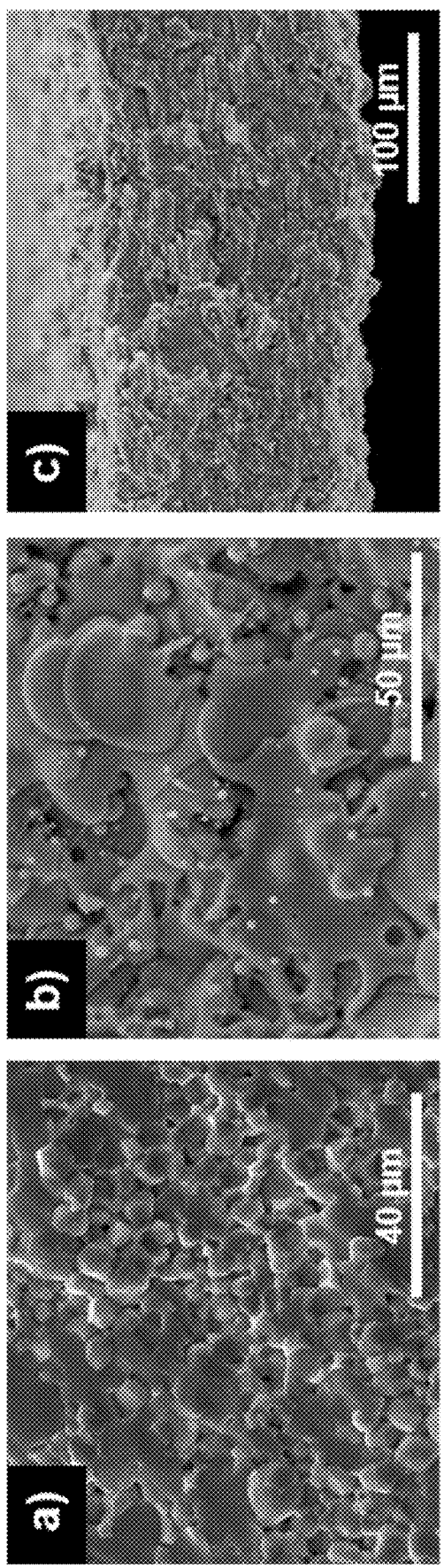
FIG. 1A: A cross-sectional scanning electron microcopy image of a solid-state ionic conductive electrolyte membrane prepared through conventional means.
FIG. 1B: A plane view scanning electron microscopy image of an interlocking layered membrane according to the present description.
FIG. 1C: A cross-sectional scanning electron microscopy image of interlocking layered membrane according to the present description.

The present description relates to systems and methods in which thermal spraying or similar fabrication processes are used to construct an interlocking layered structure (e.g. membrane) as a solid-state ionic conducting structure (e.g. membrane) for use in electrochemical systems.

The present description addresses problems of the conventionally sintered ceramic solid-state electrolyte. The present description is describing an interlocking layered structure formed by melting and spraying of ionic conductive materials. This structure uses an interlocked layered grain structure which can effectively block the partial vector of grain boundaries parallel to the electric field. Electrons transversing the membrane can be suppressed due to the lack of a perpendicular driving force to the electric field. Therefore, it suppresses the formation of through-membrane metal dendrite in batteries improving the battery performance.

The lack of high-throughput processing and penetration and propagation of metal dendrites through solid-state ionic conductive membranes have presented challenges to their integration in electrochemical systems. Thermal spray and other similar fabrication processes offer the ability to fabricate solid-state ionic conductive membranes at a large scale. In addition to lithium batteries, the processed membranes may also be incorporated into a variety of different electrical energy storage technologies. In addition, thermal spray and other similar fabrication processes can provide advantageous interlocking layered structures for avoiding or minimizing penetration and propagation of metal dendrites.

The interlocking layered structure is a structure formed by melting and spraying of ionic conductive material on a substrate. Spraying of the molten ionic conductive material smashing the ionic conductive material onto the substrate to form the shape of a plate stuck on the surface of the substrate. The melting and spraying of the ionic conductive material continues to pile up layers of the ionic conductive material on top of previously applied layers, yielding a structure of interlocked layers (i.e. sheets) of ionic conductive material piles on top of each other in a random manner. The sheets of ionic conductive material may, for example have a thickness in a range of 100 nm to tens of microns. By way of forming the interlocking layered structure, grain boundaries that travel through the sheet and are parallel to the electrical field are minimized. If there is any electrons traveling via grain boundaries to form dendrite, they would be suppressed because of the absence of the in-plane potential to drive them perpendicular to the applied electric field.

According to an aspect of the present disclosure, thermal spray processing may be used to process solid-state ionic conductive electrolytes.

According to an aspect of the present disclosure, the resulting solid-state electrolytes may have an in-layer grain structure.

An interlocking layered membrane may be, for example, freestanding, supported on a porous structure, or coated onto a substrate.

The ionic conducting interlocking layered membrane may be used in a variety of electrochemical technologies or systems such as, but not limited to, lithium ion batteries, sodium ion batteries, magnesium ion batteries, aluminum ion batteries, potassium ion batteries, zinc ion batteries, lithium metal batteries, sodium metal batteries, magnesium metal batteries, aluminum metal batteries, potassium metal batteries, zinc metal batteries, lithium-air batteries, sodium-air batteries, magnesium-air batteries, aluminum-air batteries, potassium-air batteries, and zinc-air batteries, nickel cadmium batteries, nickel-metal hydride batteries, glass batteries, lithium-ion polymer batteries, lead acid batteries, silver-zinc batteries, lithium-sulfur batteries, sodium sulfide batteries, zinc-bromide batteries, zinc-cerium batteries, redox flow batteries, vanadium-redox batteries, hybrid-flow batteries, nickel-iron batteries, nickel-zinc batteries, silicon-air batteries, lithium titanate batteries, organic radical batteries, rechargeable alkaline batteries, alkaline batteries, aluminum-air batteries, dry cell batteries, lithium batteries, lithium-air batteries, magnesium batteries, nickel oxyhydroxide batteries, paper batteries, silver-oxide batteries, sugar batteries, zinc-air batteries, zinc-carbon batteries, solid oxide fuel cells, molten batteries, and aqueous or seawater batteries.

The electrochemical technologies may be primary or secondary in nature with primary referring to a single electrochemical cycle and a secondary referring to a rechargeable system.

The present disclosure relates to the microstructure of the interlocking layered solid-state electrolyte membrane structure.

An interlocking layered structure may be formed from the melting and spraying of an ionic conducting material.

The layers in an interlocking layered structure may be formed by continuous or raster spraying of the molten ionic conducting material.

An interlocking layered structure may have an in-plane grain structure, as opposed to the irregular hexagon like grain boundary structure of conventional solid-state electrolytes prepared via thermal sintering.

When an electric field is applied across the interlocking layered structure, the grain boundary vector direction parallel to the electrical field may be blocked by the subsequent interlocking layers perpendicular to the electric field, preventing electrons from transversing the membrane.

The prevention of electron movement across the interlocking layered structure may block the penetration and propagation of metal dendrites, particularly lithium dendrites, across the membrane.

The interlocking layered structure may be partially amorphous which can further decrease the grain boundary effect by forming glass phase in-between grains.

The present disclosure relates to the thermal spraying process for the formation of the interlocking layered structure.

Thermal spraying may be defined as a coating or spraying technique where a feedstock or powder (i.e. solid-state ionic conducting ceramics) is fed into a thermal zone where said feedstock or powder is rapidly heated up to a surface molten state or plastically deformable state and accelerated toward and collides with a structure to form a film or coating.

A feedstock or powder may be defined as a solid-state ionic conductive material in its powder form that is to be used to form the interlocking layered structure.

Thermal spray may include variants such as, but not limited to, plasma spray, flame spray, wire arc spray, high velocity oxygen fuel spraying, laser assisted, induction assisted spraying processes, etc.

Thermal spray may also include any other spray process that uses an elevated temperature to melt a solid-state ionic conductive powder to form an interlocking layered membrane.

Thermal spraying may be done in atmospheric or inert environments.

Inert environments may include, but not limited to nitrogen, helium, argon etc.

Alternatively, thermal spraying may be done under vacuum conditions.

In yet another alternative, thermal spray may be carried out under reactive environment, such as oxygen, $H_2S$, ozone, or any other necessary reactive gases that can enhance the material performances.

Thermal spraying may be done manually or by use of a robotic system.

The target or surface to be sprayed may be kept at room temperature, heated up, or cooled down.

The present disclosure relates to the composition of the interlocking layered structure.

An interlocking layered structure may be composed of a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Zn^{2+}$, $Al^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include but not limited to a garnet-like structure oxide material with the general formula:

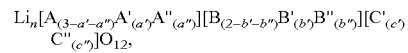

a. where A, A', and A" stand for an octahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \le a' \le 2$ and $0 \le a'' \le 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \le b'$, $0 \le b''$, and $b'+b'' \le 2$;

c. where C' and C" stand for a tetrahedral position of the crystal structure, i. where C' stands for one or more of Al, Ga, and boron, ii. where C" stands for one or more of Si and Ge, and iii. wherein $0 \le c' \le 0.5$ and $0 \le c'' \le 0.4$; and d. wherein $n=7+a'+2 \cdot a''-b'-2 \cdot b''-3 \cdot c'-4 \cdot c''$ and $4.5 \le n \le 7.5$.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP (Li$_{1-x}$Al$_x$Ge$_{2-x}$(PO$_4$)$_3$), LATP (Li$_{1+x}$Al$_x$Ti$_{2-x}$(PO$_4$)$_3$) and these materials with other elements doped therein.

In yet another example, a solid-state ionic conductive material includes anti-perovskite structure materials and their derivatives, such as the composition of Li$_3$OCl, Li$_3$OBr, Li$_3$OI.

In yet another example, a solid-state ionic conductive material includes Li$_3$YH$_6$(H=F, Cl, Br, I) family of materials, Y can be replaced by other rare earth elements.

In yet another example, a solid-state ionic conductive material includes Li$_{2x}$S$_{x+w+5}$M$_y$P$_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: Li$_{12-m-x}$(M$_m$Y$_4^{2-}$)Y$_{2-x}^{2-}$X$_x^-$, wherein M$^{m+}$=B$^{3+}$, Ga$^{3+}$, Sb$^{3+}$, Si$^{4+}$, Ge$^{4+}$, P$^{5+}$, As$^{5+}$, or a combination thereof; Y$^{2-}$=O$^{2-}$, S$^{2-}$, Se$^{2-}$, Te$^{2-}$, or a combination thereof; X$^-$=F$^-$, Cl$^-$, Br$^-$, I$^-$, or a combination thereof, and x is in the range of $0 \leq x \leq 2$.

The shape of the solid-state ionic conductive is generally planar. Alternatively, in some instance the shape may be tubular or irregular shapes.

A solid-state ionic conductive membrane may have an ionic conductivity higher than >10$^{-7}$ S/cm, more preferably in the range of >10$^{-4}$ S/cm.

The present disclosure relates to the fabrication of a freestanding interlocking layered membrane.

An interlocking layered membrane may be formed onto a removable substrate. After spraying the removable substrate may be removed leaving behind a freestanding interlocking layered membrane.

An interlocking layered membrane may or may not have a epitaxial relationship with the removeable substrate.

An interlocking layered membrane may be generally planar with some exceptions such as where the removable substrate might happen to be non-planar.

Examples of the removal process of a removable substrate are listed below.

In an example, an interlocking layered membrane may be built onto a removable substrate. The relationship between the membrane and the removable substrate may allow for the direct removal of the removable substrate.

In another example, an interlocking layered membrane can be built onto the surface of a dissolvable crystal salt substrate acting as a removable support substrate. The single crystal salt substrate then can be dissolved away in water or other solvent leaving a freestanding layered membrane.

Examples of dissolvable salt substrates may include, but not limited to halide, sulfate, nitrate, hydroxide, oxide, sulfide, carbonate, nitrite, acetate, citrate, cyanide, phosphate, etc.

In yet another example, a salt film may be deposited onto the surface of a removable support substrate. An interlocking layered membrane may be built on top of the salt film. The salt film can be removed by placing the removable substrate in solvent, such as water, to dissolve the salt film leaving a freestanding layered membrane.

Examples of salt films may include, but not limited to halide, sulfate, nitrate, hydroxide, oxide, sulfide, carbonate, nitrite, acetate, citrate, cyanide, phosphate, etc.

Examples of a removable support substrate may include, but not limited to glass, silicon wafer, copper foil, titanium foil, polymer sheet, carbon tape, composite sheet, etc.

In yet another example, a resin can be placed onto the surface of a removable support substrate. After curing of the resin, an interlocking layered membrane can be built on top of the resin layer. The resins can then be chemically removed by placing the resin layer in an appropriate aqueous or non-aqueous solvent leaving a freestanding layered membrane.

Alternatively, the resins can be removed or decomposed using a thermal treatment.

Examples of removable support substrates may include, but not limited to glass or a silicon wafer.

Examples of resins may include, but not limited to polyesters, epoxies, polyurethanes and silicones.

In yet another example, a metal film with a low melting point can act as a removable substrate. An interlocking layered membrane can be built onto the surface of the metal film. The metal can then be softened or dewetted at an elevated temperature to remove the layered membrane.

An example of a metal with a low melting point may include, but not limited to, tin, tellurium, gallium or indium. It is preferred that the metal used have a low to mild toxicity level.

In yet another example, a metal film may be used as the removable substrate. The interlocking layered membrane can be built onto the film surface. The metal film can then be dissolved by placing the solid-state ionic conductive membrane in a diluted aqueous or non-aqueous solution.

An example includes building the interlocking layered membrane on a copper film. A diluted solution of hydrogen peroxide and hydrochloric acid can dissolve the copper leaving behind a freestanding membrane.

In yet another example, laser lift off (LLO) techniques can be used to remove the substrates, a gallium nitride, sapphire, or glass may be used as a removable substrate. The interlocking layered membrane can be built onto the surface of the support substrate. A Nd:YAG laser, or KrF laser can pass through the substrate causing the membrane to delaminate resulting in a freestanding membrane.

The present disclosure relates to the fabrication of an interlocking layered membrane onto a porous supporting substrate.

An interlocking layered membrane may be thermally sprayed onto a supporting porous substrate.

A supporting porous substrate may be described as a nanoporous support or macroporous supporting in nature.

A nanoporous substrate may be defined as a porous support having an average poor diameter in the range of $1 \leq d \leq 1000$ nm, with a preferred range of $10 \leq d \leq 100$ nm.

A macroporous substrate may be defined as a porous support having an average poor diameter in the range of $1 \leq d \leq 5000$ μm, with a preferred range of $10 \leq d \leq 500$ μm Examples of a porous substrate may include, but not limited to, to nickel foam, copper foam, carbon foam, graphene foam, silicon foam, silicon carbide, silicon nitride, aluminum nitride, alumina foam, zirconia foam, silver foam, cobalt foam, graphite, stainless steel foam, etc.

The following description relates to a porous substrate supporting an interlocking layered membrane.

A porous substrate may be generally planar with some exceptions where the porous substrate might happen to be non-planar.

A non-planar porous substrate may be shaped as, but not limited to, cubic, tubular, conical, pyramidal, tubular with a hollow center, etc.

A porous substrate may be electrically conductive, semi electrically conductive or non-electrically conductive.

An electrically conductive or semi electrically conductive porous substrate may be conformally coated with a thin nonconductive layer.

A nonconductive layer may include, but not limited to, oxides, polymers, ceramics, etc.

A nonconductive layer may have a thickness in the range of $1 \leq t \leq 10000$ nm, with a preferred range of $10 \leq t \leq 1000$ nm.

A nonelectrically conductive or semi electrically conductive porous substrate may be conformally coated with a thin conductive layer.

A conductive layer may include, but not limited to, aluminum, copper, titanium, stainless steel, iron, iron oxide, carbon, nickel etc. Alternatively, the conductive layer may include a conductive polymers such as polyaniline, polypyrrole, poly(3,4-ethylenedioxythiophene (PEDOT), polyphenylene vinylene etc.

A conductive layer may have a thickness in the range of $1 \leq t \leq 10000$ nm, with a preferred range of $10 \leq t \leq 1000$ nm.

Deposition methods of a nonconductive or conductive layer may include, but not limited to, sputtering, RF sputtering, magnetron sputtering, pulsed laser deposition, atomic layer deposition, electrochemical platting, thermal spray, plasma spray, flame spray, dipping, pulsed electrochemical deposition, chemical vapor deposition, physical vapor deposition, evaporation, etc.

Alternatively, conductive and nonconductive coatings may be deposited following the formation of the solid-state ionic conductive membrane.

The following description relates to the thermal spraying of an interlocking layered membrane onto a porous substrate.

In an aspect, an interlocking layered membrane may be thermally sprayed onto a bare porous substrate with a thermal gun perpendicular to the porous substrate surface.

In another aspect, an interlocking layered membrane may be thermally sprayed onto a bare porous substrate with a thermal gun set at an angle less than 90 degrees with respect to the porous substrate surface.

In yet another aspect, an interlocking layered membrane may be thermally sprayed onto a porous substrate prefilled with a temporary filling material. After the membrane is sprayed, the temporary filling material is removed. The thermal gun may be perpendicular or set at an angle less than 90 degrees with respect to the porous substrate surface.

In yet another aspect, interlocking layered membrane may be thermally sprayed onto a porous substrate prefilled with an active secondary battery electrode material. The thermal gun may be perpendicular or set at an angle less than 90 degrees with respect to the porous substrate surface.

In yet another aspect, an interlocking layered membrane may be thermally sprayed onto a green body of a porous substrate. The after the membrane is sprayed, the green body may be converted to a porous substrate.

The following are examples of a temporary filling material process or green body support.

In an example, a porous substrate is placed in a saturated salt solution. Water is then removed via evaporation leaving the porous structure filled with a solid salt. After the interlocking layered membrane if formed, the porous substrate can be placed in fresh water to dissolve the salt filler away.

Examples of a solid salt may include, but not limited to halide, sulfate, nitrate, hydroxide, oxide, sulfide, carbonate, nitrite, acetate, citrate, cyanide, phosphate, etc.

In another example, a porous substrate could be filled with a thermoset polymer, resin or thermoplastic followed by curing. After the solid-state ionic conductive membrane is built on top, the resin can be removed by chemical etching or thermal decomposition.

Examples of resins may include, but limited to acrylic, polyesters, epoxies, polypropylene, nylon, polytetrafluoroethylene, polyurethanes, phenolic and silicones.

Thermoset polymers or resins may be deposited onto the porous substrate by means of, but not limited to spraying, spin coating, drop casting, dipping, etc.

In yet another example, polydimethylsiloxane could be used to fill a porous substrate followed by curing. After the interlocking layered membrane is built on top, the porous substrate is etched, dissolved or decomposed away. The polydimethylsiloxane will then act as the new porous substrate.

An example may include, but not limited to filling the voids of a copper foam with polydimethylsiloxane followed by curing. After the interlocking layered membrane is formed, the copper foam is dissolved away by placing using a mixture of hydrogen peroxide and hydrochloric acid. Another example may include, but not limited to filling the voids of a carbon foam with polydimethylsiloxane followed by curing. After the membrane is built on top, the carbon foam is removed by thermal decomposition.

In yet another example, the interlocking layered membrane may be built on a porous support forming green body followed by co-pyrolysis processing.

An example may include, but not limited to using a highly crosslinked hybrid organic-inorganic polymer resin matrix composed of polycarosilane, diisocyanates and an epoxy resin to prepare a silicon carbide foam. Typically, the resulting hybrid matrix is heated, and a subsequent pyrolysis yields an open cell silicon carbide foam. Before the pyrolysis process, the interlocking layered membrane can be built on the surface of the hybrid matrix. After the membrane is built, pyrolysis can yield an open cell silicon carbide foam. In this example, the silicon carbide foam is the new porous support scaffold.

The present disclosure relates to the fabrication of an interlocking layered membrane onto a permanent substrate.

An interlocking layered membrane may be thermally sprayed onto a permanent substrate.

A permanent substrate may be defined as, but not limited to, metals, semi conductive materials, nonconductive materials.

A metal substrate may include, but not limited to, copper, aluminum, titanium, stainless steel, tantalum, chromium, cobalt, gold, silver, indium, magnesium, molybdenum, niobium, nickel, lead, palladium, vanadium, tungsten, zirconium, zinc, iron, gold, sodium, platinum, tin, beryllium, rhodium, bismuth, iridium, cadmium, uranium, osmium, tantalum, potassium, ruthenium, rhenium, calcium, plutonium, scandium, cerium, hafnium, dysprosium, thorium, yttrium, radium, lanthanum, samarium, gadolinium, thallium, neodymium, etc.

A semi conductive substrate may include, but not limited to, diamond, silicon wafer, germanium wafers, gray tin, silicon carbide, gray selenium, red selenium, tellurium, boron nitride, boron phosphide, boron arsenide, aluminum nitride, aluminum phosphide, aluminum arsenide, aluminum antimonide, gallium nitride, gallium phosphide, gallium arsenide, gallium antimonide, indium nitride, indium phosphide, indium arsenide, indium antimonide, cadmium selenide, cadmium sulfide, cadmium telluride, zinc oxide, zinc selenide, zinc sulfide, zinc telluride, cuprous chloride copper sulfide, lead selenide, lead (II) sulfide, lead telluride, tin (II) sulfide, ten telluride, lead tin telluride, thallium tin telluride, thallium germanium telluride, bismuth telluride, cadmium phosphide, cadmium arsenide, cadmium antimonide, zinc phosphide, zinc arsenide, zinc antimonide, titanium dioxide, copper oxide, uranium dioxide, uranium trioxide, bismuth trioxide, tin dioxide, barium titanate, strontium titanate, lithium niobite, lanthanum copper oxide, monoclinic vanadium oxide, lead iodide, molybdenum disulfide, gallium selenide, tin sulfide, bismuth sulfide, gallium manganese arsenide, indium manganese arsenide, cadmium manganese telluride, lead manganese telluride, lanthanum calcium manganate, iron(II) oxide, nickel (II) oxide, europium (II) oxide, chromium (III) bromide, copper indium selenide, silver gallium sulfide, zinc silicon phosphide, arsenic trisulfide, platinum silicide, mercury (II) iodide, thallium bromide, silver sulfide, iron disulfide, copper zinc tin sulfide, copper zinc antimony sulfide, copper tin sulfide, etc.

A secondary battery electrode may be formed onto a substrate, and an interlocking layered may be thermally sprayed onto said secondary battery electrode. It is assumed that the environment where such a thermal spray process occurs (i.e. inert) is suitable as to not destroy the electrode material.

An electrode may be coated onto current collectors such as, but not limited to, aluminum, copper, carbon, titanium, stainless steel, nickel, mesh like structure, etc.

An interlocking layered membrane may be thermally sprayed to cover the whole or only part of the substrate surface.

A substrate may be coated with an interlocking layered membrane on one or more of its sides.

For example, a current collector may be coated with an active electrode material on both sides, and an interlocking layered membrane maybe coated on both surface of the active electrode material.

An interlocking layered membrane may be thermally sprayed onto a second ionic conducting solid-state electrolyte membrane, wherein the second membrane has been tape casted and sintered.

For example, interlocking layered membrane, composed of garnet-oxide structure LLZO, may be formed onto a freestanding tape casted LLZO membrane.

The present disclosure relates to secondary battery containing an interlocking layered membrane.

A secondary battery may be defined as a battery that can be recharged and not limited to one discharge cycle.

Secondary batteries may be in the form of, but not limited to, ion-based batteries or metal batteries.

Secondary batteries may be in the shape or orientation of, but not limited to, pouch, cylindrical, coin, button, or prismatic type cells.

Types of secondary batteries may include, but not limited to, lithium ion batteries, sodium ion batteries, magnesium ion batteries, aluminum ion batteries, potassium ion batteries, zinc ion batteries, lithium metal batteries, sodium metal batteries, magnesium metal batteries, aluminum metal batteries, potassium metal batteries, zinc metal batteries, nickel cadmium battery, nickel-metal hydride battery, glass battery, lithium-ion polymer, lithium-sulfur battery, sodium sulfide battery, zinc-bromide battery, lithium titanate battery, aqueous or seawater battery.

A secondary battery may be a solid-state secondary battery which includes an composite cathode, composite anode or metal/metal-alloy anode, and an interlocking layered membrane.

Alternatively, a secondary battery may be a liquid, polymer, or semi-solid-state secondary battery which includes a cathode or composite cathode, an anode or composite anode or metal/metal-alloy anode, an interlocking layered membrane, and a liquid-based or gel-polymer based electrolyte.

The present description relates to a secondary battery cathode.

A secondary battery cathode or composite cathode may be coated with a thin protective layer on the surface to enhance stability and reduce interface resistance with the interlocking layered membrane.

A cathode may have the following characteristics

A cathode may be comprised of, but not limited to, an active intercalation material, binder, and an electronically conductive additive.

A cathode may contain an active intercalation material such as, but not limited to, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K etc.), vanadium oxides, iron sulfide $FeF_3$, LiSe.

The cathode may interact with ions through non-intercalation mechanism. Examples of a cathode may include, but not limited to, oxygen, air, water, or sulfur.

In the case of a lithium intercalation, cathodes may include, but not limited to, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A cathode may include a binder such as, but not limited to, polyvinylidene fluoride, polyacrylic acid, lotader, carboxymethyl cellulose, styrene-butadiene rubber, sodium alginate, etc.

A cathode may include an electronically conductive additive such as, but not limited to, graphene, reduced graphene oxide, carbon nanotubes, carbon black, Super P, acetylene black, carbon nanofibers or a conductive polymer such as polyaniline, polypyrrole, poly(3,4-ethylenedioxythiophene (PEDOT), polyphenylene vinylene etc.

A composite cathode may have the following characteristics

A composite cathode may be comprised of, but not limited to, an active intercalation material, binder, electronically conductive additive, and an ionic conducting media.

A composite cathode may contain an active intercalation material such as, but not limited to, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K etc.), vanadium oxides, sulfur, lithium sulfide $FeF_3$, LiSe.

In the case of a lithium intercalation, composite cathodes may include, but not limited to, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A composite cathode may include a binder such as, but not limited to, polyvinylidene fluoride, polyacrylic acid, carboxymethyl cellulose, styrene-butadiene rubber, sodium alginate, etc.

A composite cathode may include an electronically conductive additive such as, but not limited to, graphene, reduced graphene oxide, carbon nanotubes, carbon black, Super P, acetylene black, carbon nanofibers or a conductive polymer such as polyaniline, polypyrrole, poly(3,4-ethylenedioxythiophene) (PEDOT), polyphenylene vinylene etc.

The ionic conducting media in a composite cathode may include, but not limited to, a polymer, ionic-conductive ceramic, or polymer-ceramic composite.

A polymer in a composite cathode may include an ionic conducting or nonionic conducting polymer.

Examples of polymers may include, but not limited to, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

In the case of a nonionic polymer, an ionic conductive salt may be added. Examples of ionic conducting salts may include, but not limited to, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis (trifluoromethanesulfonyl)imide (NaTFSI) and sodium bis (fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg (FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

An ionic conductive ceramic used in a composite cathode may have the following characteristics.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to H$^+$, Li$^+$, Na$^+$, K$^+$, Ag$^+$, Mg$^{2+}$, Zn$^{2+}$, Al$^{3+}$, etc.

The ionic conductivity of the corresponding ions is preferably to be >10$^{-7}$ S/cm. It is preferably to have lower electronic conductivity (<10$^{-7}$ S/cm).

Examples of the solid-state ionic conductive material include but not limited to a garnet-like structure oxide material with the general formula:

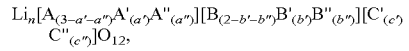

a. where A, A', and A" stand for an octahedral position of the crystal structure, i. where A stands for one or more trivalent rare earth elements, ii. where A' stands for one or more alkaline earth elements, iii. where A" stands for one or more alkaline metal elements other than Li, and iv. wherein 0≤a'≤2 and 0≤a"≤1;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein 0≤b', 0≤b", and b'+b"≤2;

c. where C' and C" stand for a tetrahedral position of the crystal structure, i. where C' stands for one or more of Al, Ga, and boron, ii. where C" stands for one or more of Si and Ge, and iii. wherein 0≤c'≤0.5 and 0≤c"≤0.4; and d. wherein n=7+a'+2·a"−b'−2 b"−3·c'−4·c" and 4.5≤n≤7.5.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^=O^{2-}$, $S^{2-}$, $Se^{2-}$, $Te^{2-}$, or a combination thereof; $X^-=F^-$, $Cl^-$, $Br^-$, $I^-$, or a combination thereof, and x is in the range of $0 \le x \le 2$.

The present description relates to a secondary battery anode.

A secondary battery anode, metal/metal-alloy anode, or composite anode may be coated with a thin layer on the surface to enhance stability and reduce interface resistance with the interlocking layered membrane.

An anode may have the following characteristics.

In the case of an ion-based secondary battery an anode may also comprise of, but not limited to, an active material, binder, and electronically conductive additive. Active materials may interact with ions through various mechanisms including, but not limited to, intercalation, alloying and conversion.

An active material anode material may include, but not limited to, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

An anode may include a binder such as, but not limited to, polyvinylidene fluoride, polyacrylic acid, carboxymethyl cellulose, styrene-butadiene rubber, sodium alginate, etc.

An anode may include an electronically conductive additive such as, but not limited to, graphene, reduced graphene oxide, carbon nanotubes, carbon black, Super P, acetylene black, carbon nanofibers or a conductive polymer such as polyaniline, polypyrrole, poly(3,4-ethylenedioxythiophene) (PEDOT), polyphenylene vinylene etc.

A metal/metal alloy anode may have the following characteristics.

In the case of a metal-based secondary battery an anode may comprise of a metal or metal alloy.

Metal/metal-alloy anodes may interact with ions through a plating and stripping mechanism.

Such an anode may be comprised of, but not limited to, lithium metal, lithium metal alloy, sodium metal, sodium metal alloy, magnesium metal, magnesium metal alloy, aluminum metal, aluminum metal alloy, potassium metal, potassium metal alloy, zinc metal, zinc metal alloy.

Alloys may include materials such as, but not limited to, indium, manganese, etc.

A composite anode may have the following characteristics.

Generally, a composite anode is used in an solid-state secondary battery. Composite anodes are composed of an active material, binder, electronically conductive additive, and an ionic conductive media. Active materials may interact with ions through various mechanisms including, but not limited to, intercalation, alloying and conversion.

An active material anode material may include, but not limited to, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

A composite anode may include a binder such as, but not limited to, polyvinylidene fluoride, polyacrylic acid, carboxymethyl cellulose, styrene-butadiene rubber, sodium alginate, etc.

A composite anode may include an electronically conductive additive such as, but not limited to, graphene, reduced graphene oxide, carbon nanotubes, carbon black, Super P, acetylene black, carbon nanofibers or a conductive polymer such as polyaniline, polypyrrole, poly(3,4-ethylenedioxythiophene) (PEDOT), polyphenylene vinylene etc.

The ionic conducting media in a composite anode may include, but not limited to, a polymer, ionic-conductive ceramic, or polymer-ceramic composite.

A polymer used in a composite anode may be an ionic conducting or nonionic conducting polymer Examples of polymers may include, but not limited to, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

In the case of a nonionic polymer, an ionic conductive salt may be added. Examples of ionic conducting salts may include, but not limited to, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

An ionic conductive ceramic used in a composite anode may have the following characteristics.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to H$^+$, Li$^+$, Na$^+$, K$^+$, Ag$^+$, Mg$^{2+}$, Zn$^{2+}$, Al$^{3+}$, etc.

The ionic conductivity of the corresponding ions is preferably to be >10$^{-7}$ S/cm. It is preferably to have lower electronic conductivity (<10$^{-7}$ S/cm).

Examples of the solid-state ionic conductive material include but not limited to a garnet-like structure oxide material with the general formula:

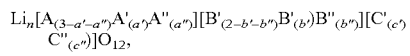

a. where A, A', and A" stand for an octahedral position of the crystal structure, i. where A stands for one or more trivalent rare earth elements, ii. where A' stands for one or more alkaline earth elements, iii. where A" stands for one or more alkaline metal elements other than Li, and iv. wherein 0≤a'≤2 and 0≤a"≤1;
b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein 0≤b', 0≤b", and b'+b"≤2;
c. where C' and C" stand for a tetrahedral position of the crystal structure, i. where C' stands for one or more of Al, Ga, and boron, ii. where C" stands for one or more of Si and Ge, and iii. wherein 0≤c'≤0.5 and 0≤c"≤0.4; and
d. wherein n=7+a'+2·a"−b'−2·b"−3·c'−4·c" and 4.5≤n≤7.5.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP (Li$_{1−x}$Al$_x$Ge$_{2−x}$(PO$_4$)$_3$), LATP (Li$_{1+x}$Al$_x$Ti$_{2−x}$(PO$_4$)$_3$) and these materials with other elements doped therein.

In yet another example, a solid-state ionic conductive material includes anti-perovskite structure materials and their derivatives, such as the composition of Li$_3$OCl, Li$_3$OBr, Li$_3$OI.

In yet another example, a solid-state ionic conductive material includes Li$_3$YH$_6$(H=F, Cl, Br, I) family of materials, Y can be replaced by other rare earth elements.

In yet another example, a solid-state ionic conductive material includes Li$_{2x}$S$_{x+w+5}$M$_y$P$_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: Li$_{12−m−x}$(M$_m$Y$_4^{2−}$)Y$_{2−x}^{2−}$X$_x^−$, wherein M$^{m+}$=B$^{3+}$, Ga$^{3+}$, Sb$^{3+}$, Si$^{4+}$, Ge$^{4+}$, P$^{5+}$, As$^{5+}$, or a combination thereof; Y$^{2−}$=O$^{2−}$, S$^{2−}$, Se$^{2−}$, Te$^{2−}$, or a combination thereof; X$^−$=F$^−$, Cl$^−$, Br$^−$, I$^−$, or a combination thereof, and x is in the range of 0≤x≤2.

The present description relates to a liquid-based electrolyte in a liquid or semi-solid-state secondary battery.

Liquid-based electrolytes may include, but not limited to, an organic-based liquid electrolyte or a room temperature ionic liquid electrolyte.

Examples of organic-based liquid electrolyte may include, but not limited to, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Examples of room temperature ionic liquid electrolyte may include, but not limited to, imidazolium, pyrrolidinium, piperidinium, ammonium, hexafluorophosphate, dicyanamide, tetrachloroaluminate, sulfonium, phosphonium, pyridinium, parazonium and thiazolium.

An organic-based liquid electrolyte and a room temperature ionic liquid electrolyte may include an ionic conducting salt.

Examples of ionic conducting salts may include, but not limited to, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

The present disclosure relates to other electrochemical systems using an interlocking layered membrane.

Other electrochemical cells may include, but not limited to, flow type batteries, lithium sulfur batteries, sodium sulfur batteries, molten salt batteries, air batteries, and lithium primary batteries.

The present description relates a flow type batteries.

A flow type battery, also termed a redox flow type battery in the art, is a type of electrochemical system where electrochemical energy is stored and provided by two electrochemical components dissolved in liquids termed a catholyte and anolyte, which are contained within a system and separated by an interlocking layered membrane.

An interlocking layered membrane may be used to both conduct ion an prevent crossover between the catholyte and anolyte.

Flow type batteries may also be referred to as a regenerative fuel cell or a secondary fuel cell. The energy stored in a flow battery may be governed by the size of the anolyte and/or catholyte storage tanks.

Types of flow batteries may include, but not limited to, redox, hybrid, organic, metal hydride, nano-network, or semi-solid.

Other types of flow batteries may include, but not limited to, organic, both aqueous and nonaqueous types, metal hydride, and nano-structure; wherein the flow batteries have a similar design to either that of a redox or hybrid system, and use an ion-exchange, ion-selective, or ceramic ion conducting membrane. Electrodes, catholytes, and analytes are specific for each system and are described elsewhere in the art.

The present description relates to lithium sulfur and sodium sulfur batteries.

Lithium-sulfur batteries may be characterized as a secondary battery with metallic lithium as the negative electrode and sulfur as the positive electrode; wherein a liquid organic solution composed of lithium salt and an ether, such as cyclic ether, short-chain ether, or glycol ether, or a combination thereof, serve as the electrolyte. And an interlocking layered membrane is used to separate the lithium anode from the sulfide cathode.

Alternatively, the anode may be composed of carbon, lithiated carbon, or silicon.

Sodium-sulfur batteries may be characterized as a secondary battery with metallic sodium as the negative electrode and sulfur as the positive electrode; wherein a liquid organic solution composed of sodium salt and an ether, such as cyclic ether, short-chain ether, or glycol ether, or a combination thereof, serve as the electrolyte. And an interlocking layered membrane is used to separate the lithium anode from the sulfide cathode.

Alternatively, the anode may be composed of carbon, lithiated carbon, or silicon.

In some instance the sulfur cathode may be encapsulated within a carbon structure, or a structure of similar design, or coated with a polymer as to reduce or prevent the polysulfide shuttle effect.

The present description relates to molten-salt batteries.

A molten salt battery may include, but not limited to, sodium-sulfur or sodium-nickel chloride (Zebra) batteries.

A sodium-sulfur (NaS) battery may be characterized as a secondary molten-salt battery with metallic sodium as the negative electrode and sulfur as the positive electrode; wherein both electrodes are typically in a liquid state during battery operation. An electrolyte for an NaS battery may include, but not limited to, an interlocking beta alumina layered membrane as a ceramic solid electrolyte typically in tubular form.

A sodium-nickel chloride (Na—NiCl$_2$) or Zebra battery may be characterized as a secondary molten-salt battery with metallic sodium as the negative electrode and nickel as the positive electrode; wherein the sodium is in liquid state during battery operation. An electrolyte for a Na—NiCl$_2$ battery may include, but not limited to, molten sodium tetrachloroaluminate (NaAlCl$_4$), with an interlocking beta alumina layered membrane serving as a separator between NaAlCl$_4$ and molten sodium.

The present disclosure relates to air batteries.

An air battery may include primary air batteries or secondary air batteries.

Primary air batteries may include, but not limited to, aluminum air and zinc air batteries.

Secondary air-batteries may include, but not limited to, lithium-air batteries, sodium-air batteries, potassium-air batteries, aluminum-air, iron-air batteries, silicon-air batteries.

A secondary air-battery may contain metal, metal alloy, metal oxide as the negative electrode or anode. For example, a lithium-air battery may contain lithium metal or a lithium metal alloy. A sodium-air battery may contain sodium metal or sodium metal alloy. A potassium-air battery may contain potassium metal or a potassium metal alloy. A silicon-air battery may contain silicon metal, a silicon wafer, or a silicon alloy. An iron-air battery may contain iron metal or iron oxide anode.

A secondary air-battery anode may be coated with a thin layer to serve as, but not limited to, an artificial solid electrolyte interface layer as a protective layer or a layer to reduce resistance at the electrode/interlocking layered membrane interface.

A secondary air-battery may contain a porous cathode structure as to allow atmospheric oxygen to enter the system. The porous cathode may be composed of carbon such as a mesoporous carbon. Alternatively, the porous cathode may be a screen, grid, or foam material such as nickel foam, and coated with a carbon layer.

The secondary air-battery may contain a catalyst such as, but not limited to, manganese, cobalt, ruthenium, platinum, silver, or a combination thereof. A catalyst may be deposited onto the carbon in the instance of a catalyst particle or oriented within the carbon structure as a dopant.

Alternatively, a secondary air-batteries may be devoid of a cathode structure where atmospheric oxygen acts as the cathode, as in the case of silicon-air batteries.

A secondary air-battery may contain a liquid electrolyte with the nature or composition of, but not limited to, aprotic, aqueous, mixed aqueous/aprotic, or solid-state.

The present description relates to lithium primary batteries.

Primary batteries, particularly lithium primary batteries, may use an interlocking layered membrane as the separator.

Lithium primary batteries may include, but not limited to, Lithium Carbon Monofluoride, Lithium Manganese Dioxide, Lithium Copper Oxide, Lithium Thionyl Chloride, Other primary lithium batteries may be specialized having a cathode composed of, but not limited to, lithium silver chromate, lithium silver vanadium oxide, lithium lead bismuthate, lithium bismuth trioxide, lithium copper sulfide, lithium lead copper sulfide, lithium iodine, lithium sulfur dioxide, lithium sulfuryl chloride, etc.

The drawings of the present disclosure further describes examples of electrochemical cells using thermally sprayed solid-state ionic conductive membranes.

FIG. 1A: A cross-sectional scanning electron microcopy image of a solid-state ionic conductive electrolyte membrane prepared through conventional means such as pressing and followed by thermal treatment.

FIG. 1B: A plane view scanning electron microscopy image of an interlocking layered membrane prepared via thermal spraying showing the molten/harden structure of the ionic conductive ceramic membrane. The scanning electron microscopy image FIG. 1B shows additional inventive features of the microstructure of the interlocking layered structure of the present description. The present description includes all aspects of the disclosed microstructure.

FIG. 1C: A cross-sectional scanning electron microscopy image of interlocking layered membrane with a thickness of ~170 µm, prepared via thermal spraying, demonstrating the in-plane layered nature of the structure. The scanning electron microscopy image FIG. 1C shows additional inventive features of the microstructure of the interlocking layered structure of the present description. The present description includes all aspects of the disclosed microstructure.

Figure 2B:
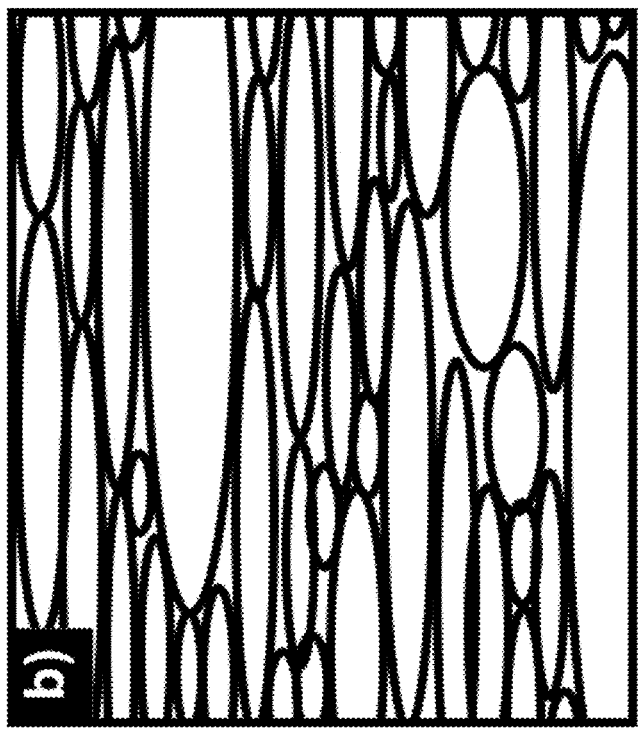
FIG. 2B: A schematic illustration of an interlocking layered membrane according to the present description.
Figure 2A:
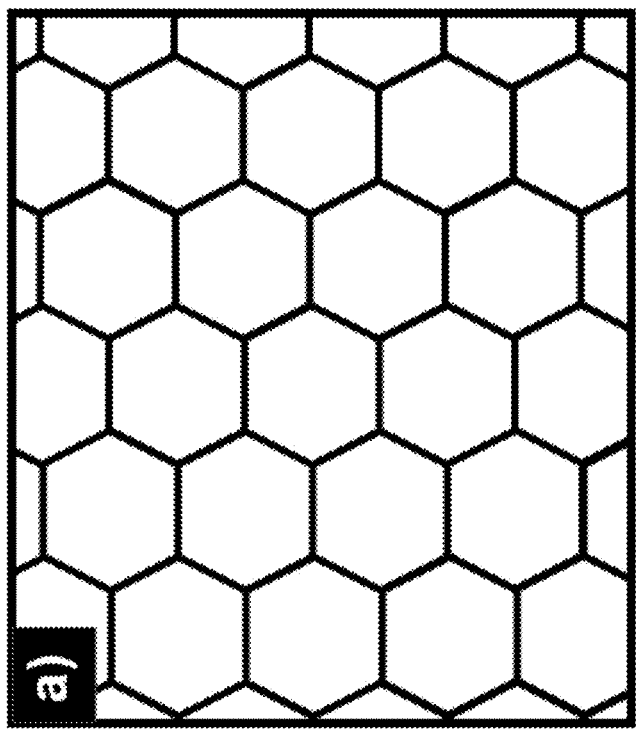
FIG. 2A: A schematic illustration of a solid-state ionic conductive electrolyte membrane prepared through conventional means.

FIG. 2A: A schematic illustration of a solid-state ionic conductive electrolyte membrane prepared through conventional means, such as pressing and followed by thermal treatment, showing the randomly distributed, irregular hexagon-like, high angle grain boundary structure.

FIG. 2B: A schematic illustration of the interlocking layered membrane prepare through thermal spraying, showing the in-plane layered grain structure. The illustration of FIG. 2B shows additional inventive features of the microstructure of the interlocking layered structure of the present description. The present description includes all aspects of the disclosed microstructure.

Figure 3B:
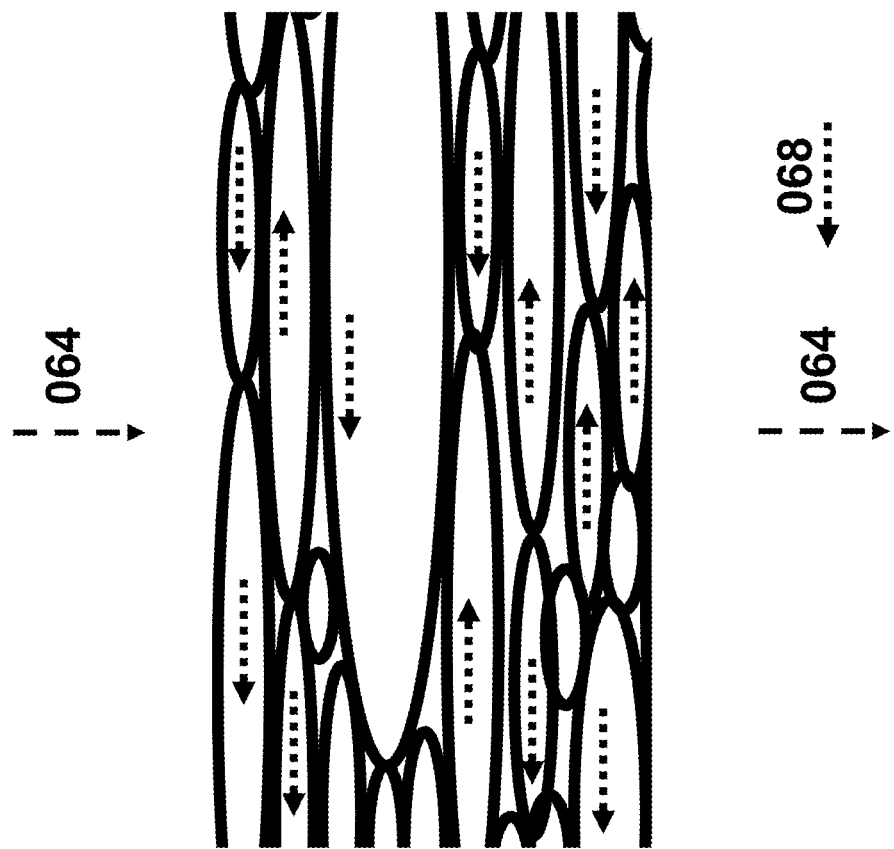
FIG. 3B: A schematic illustration of an interlocking layered membrane according to the present description
Figure 3A:
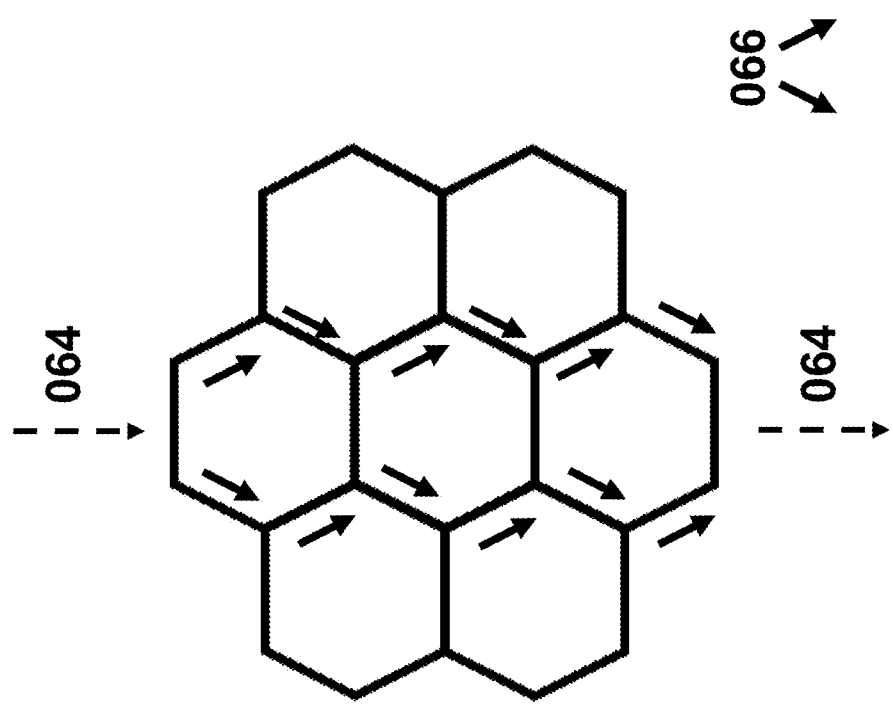
FIG. 3A: A schematic illustration a conventional solid-state structure, in which the grain boundaries always have a partial vector parallel to the applied electric field.

FIG. 3A: A schematic illustration of the grain boundary vector direction (066) in an applied electrical field (064) in a conventional solid-state conductive with randomly distributed, irregular hexagon-like, high angle grain boundaries.

FIG. 3B: A schematic illustration of the grain boundary vector direction (068) perpendicular to the direction of an applied electric field (064), wherein the subsequent layers block the transversing of electrons. The illustration demonstrates the ability of the interlocking layered structure to block the penetration and propagation of metal dendrites such as lithium dendrites. The illustration of FIG. 3B shows additional inventive features of the microstructure of the interlocking layered structure of the present description. The present description includes all aspects of the disclosed microstructure.

Figure 4B:
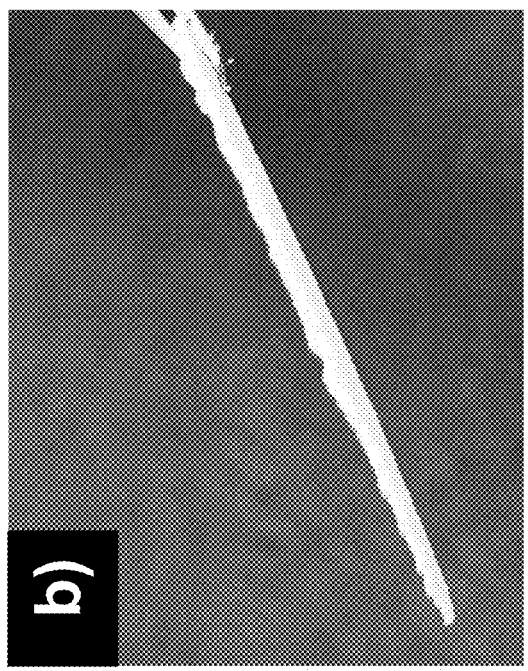
FIG. 4B: A side-view digital image of a freestanding interlocking layered membrane according to the present description.
Figure 4A:
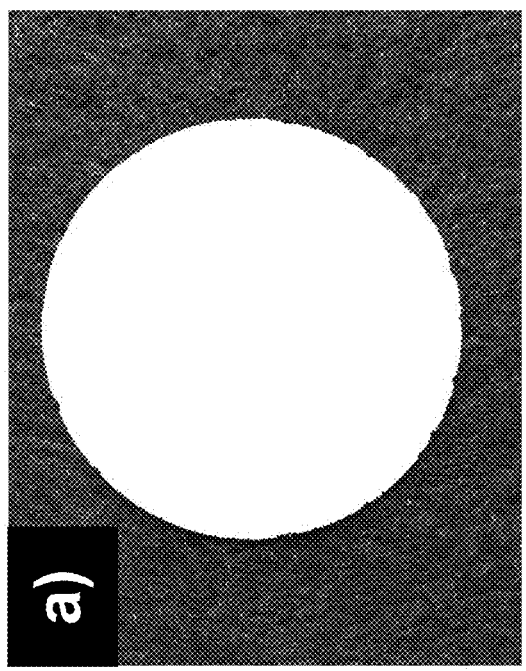
FIG. 4A: A top-view digital image of a freestanding interlocking layered membrane according to the present description.

FIG. 4A: A top-view digital image of a thermally sprayed freestanding interlocking layered membrane with a diameter of 2.5 cm.

FIG. 4B: A side-view digital image of a thermally sprayed freestanding interlocking layered membrane with a thickness of ~250 µm.

FIG. 5A: A cross-sectional scanning electron microscopy image of an interlocking layered structure thermally sprayed onto a porous substrate.

FIG. 5B: A tilted plane view digital image of an interlocking layered membrane supported on a porous supporting structure.

Figure 6:
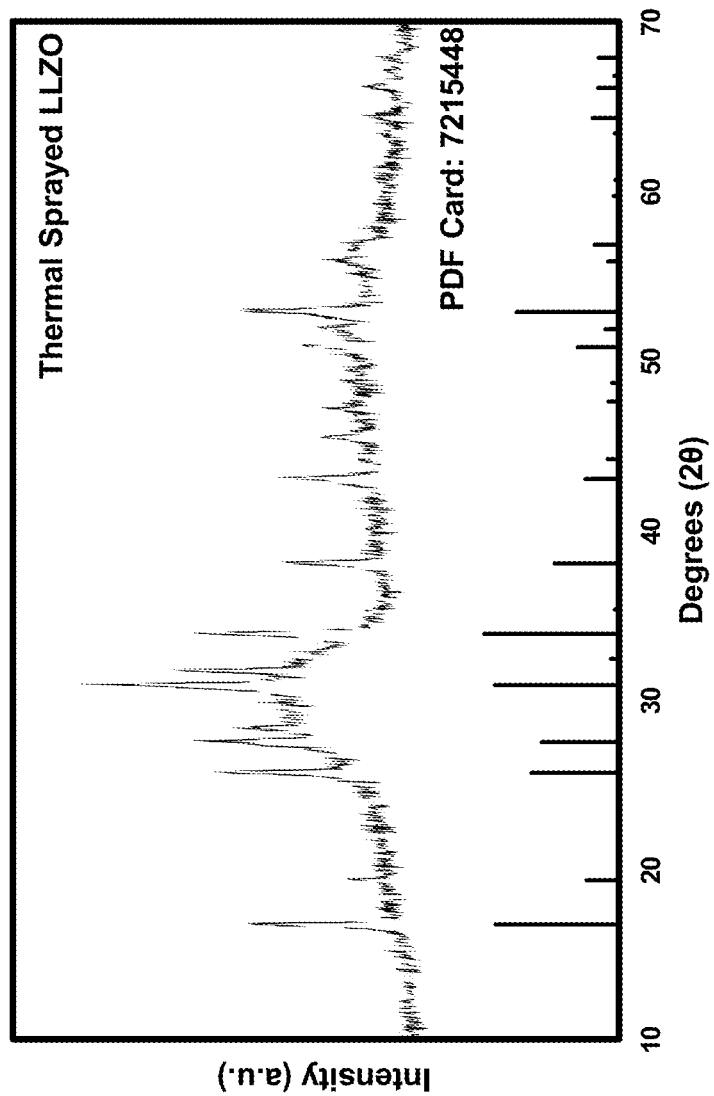
FIG. 6: An X-ray diffraction spectra of a thermally sprayed lithium lanthanum zirconium oxide (LLZO) interlocking layered membrane and is compared with the standard LLZO PDF card No. 7215448.

FIG. 6: An X-ray diffraction spectra of a thermally sprayed lithium lanthanum zirconium oxide (LLZO) interlocking layered membrane and is compared with the standard LLZO PDF card No. 7215448. The sprayed membrane shows amorphous phases in the material.

Figure 7:
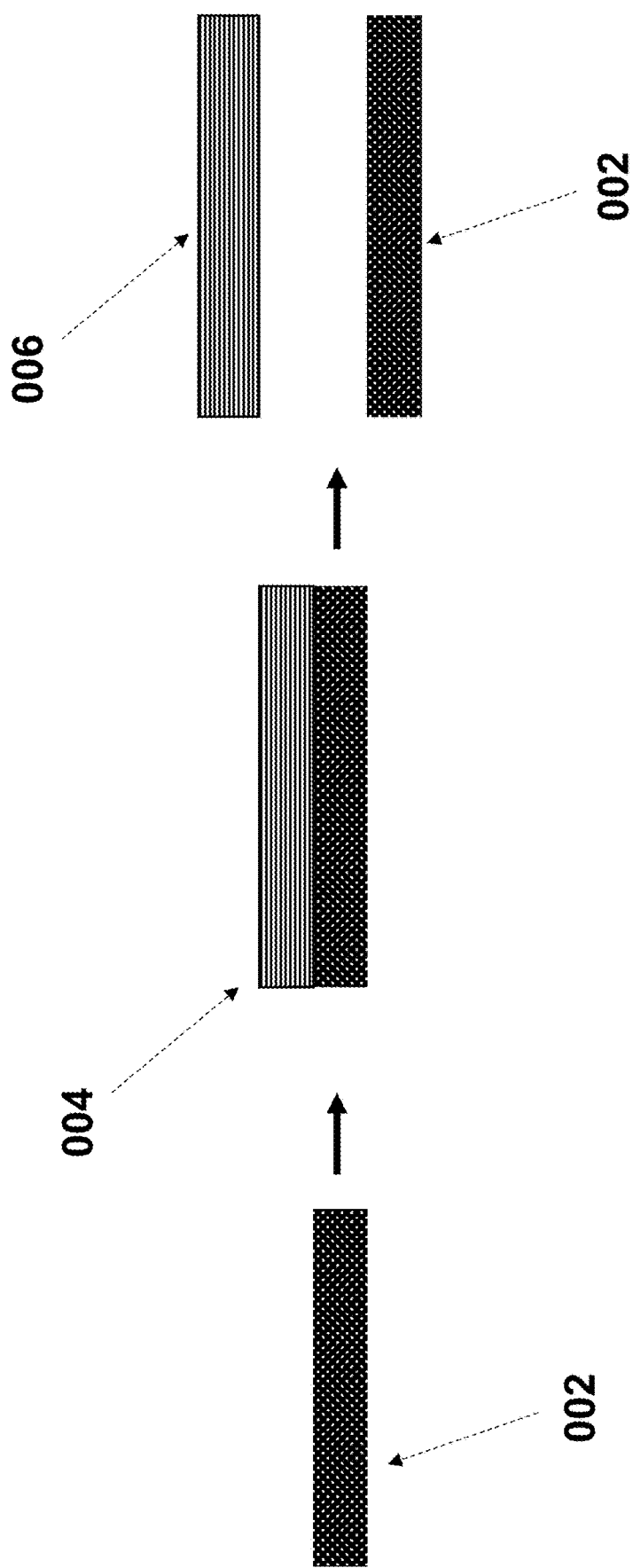
FIG. 7: A schematic illustration of a free-standing membrane fabrication process according to the present description.

FIG. 7: A schematic illustration of a fabrication process for interlocking layered structure, wherein the ionic conductive membrane (004) is thermally sprayed onto a removable substrate (002). The removable substrate is removed from the solid-state ionic conductive membrane to form a freestanding solid-state ionic conductive membrane (006).

Figure 8A:
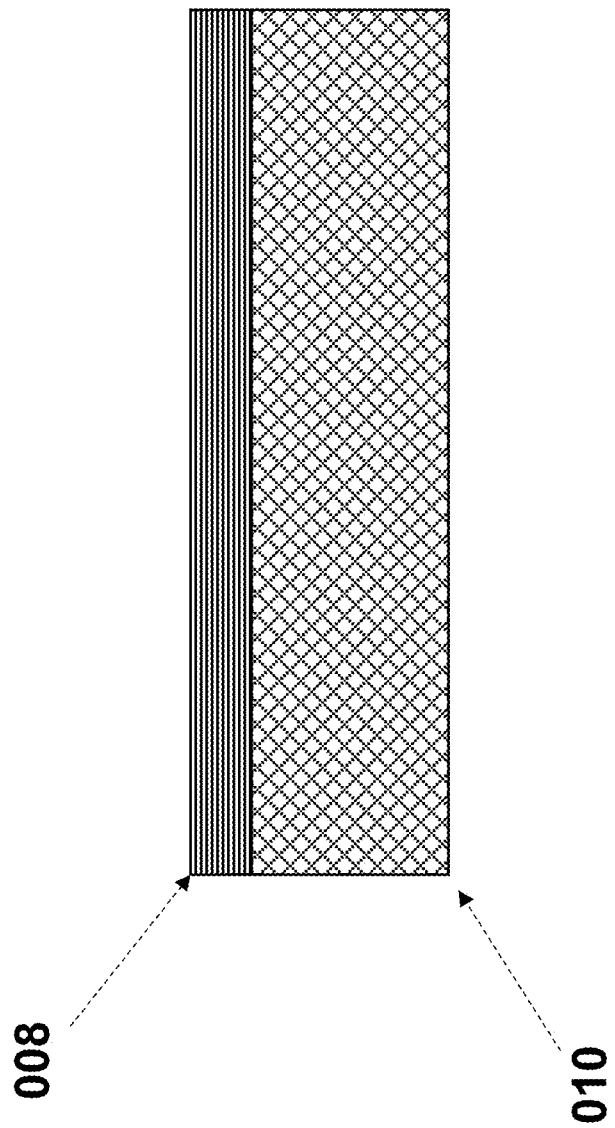
FIG. 8A: A schematic illustration of an interlocking layered membrane supported on a porous supporting substrate according to the present description.

FIG. 8A: A schematic illustration of an interlocking layered membrane supported on a porous supporting substrate, where the ionic conductive membrane supported on a porous supporting substrate (008) is sprayed onto a bare porous substrate (010).

Figure 8B:
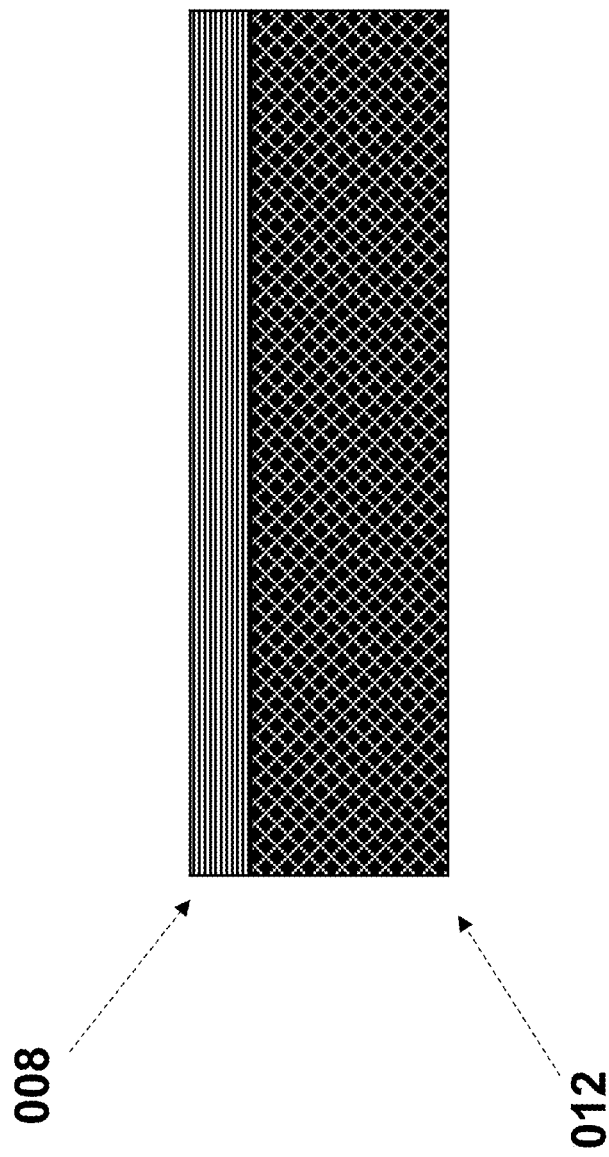
FIG. 8B: A schematic illustration of an interlocking layered membrane supported on a porous supporting substrate according to the present description.

FIG. 8B: A schematic illustration of an interlocking layered membrane supported on a porous supporting substrate, where the ionic conductive membrane supported on a porous supporting substrate (008) is sprayed onto a porous supporting substrate prefilled with a temporary filling material (012).

Figure 8C:
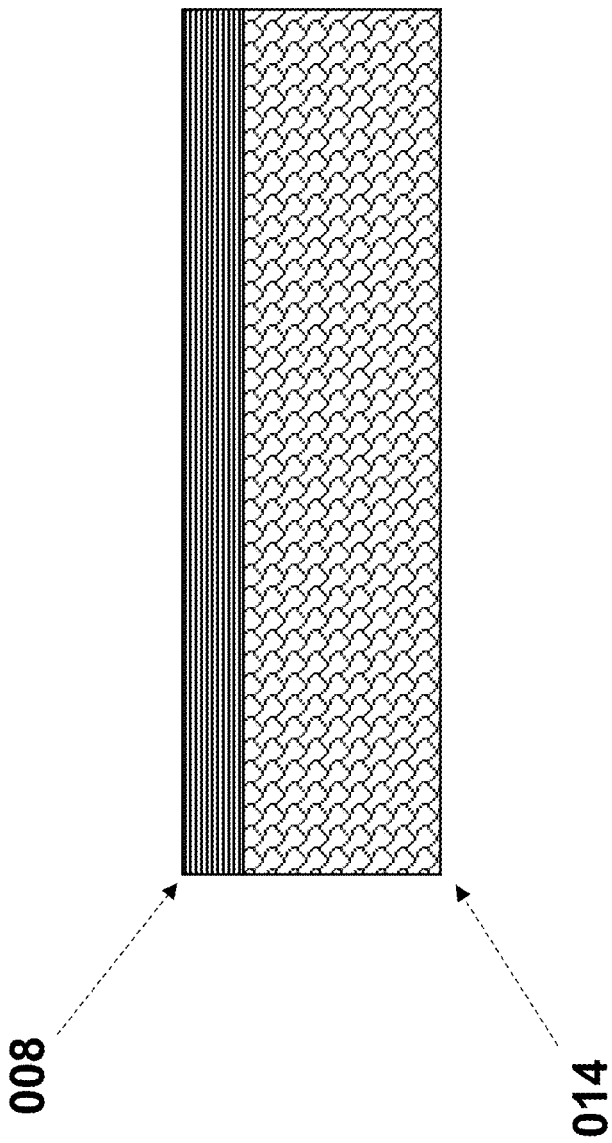
FIG. 8C: A schematic illustration of an interlocking layered membrane supported on a porous supporting substrate according to the present description.

FIG. 8C: A schematic illustration of an interlocking layered membrane supported on a porous supporting substrate, where the ionic conductive membrane supported on a porous supporting substrate (008) is sprayed onto a porous supporting substrate prefilled with an active secondary battery electrode material (014).

FIG. 9A: A schematic illustration of an interlocking layered membrane formed onto a flat surface, where in the ionic conductive membrane (016) is formed on a nonelectronically conductive substrate (018).

FIG. 9B: A schematic illustration of an interlocking layered membrane formed onto a flat surface, where in the ionic conductive membrane (016) is formed onto an electrically conductive substrate (020).

Figure 10:
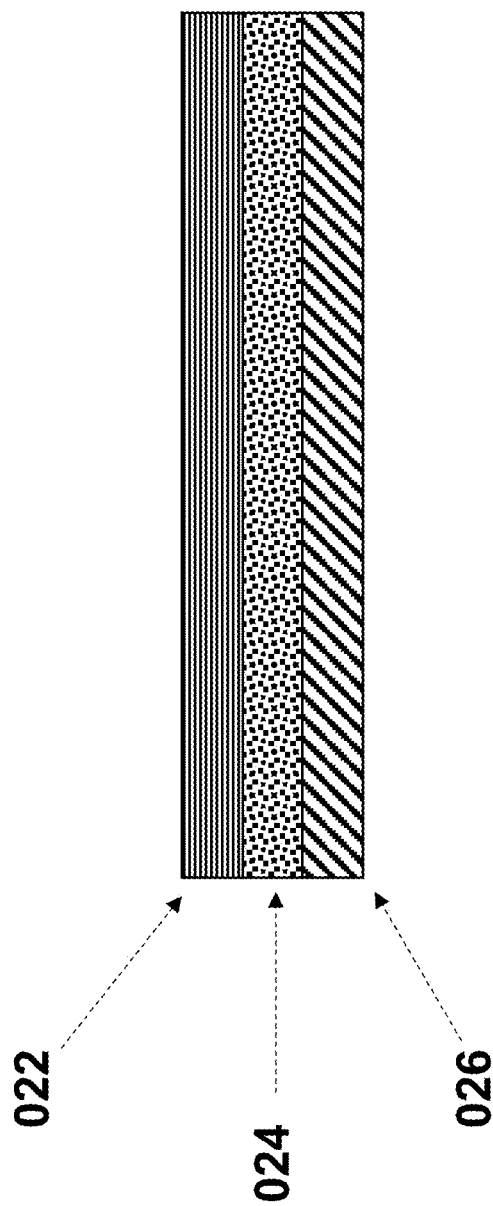
FIG. 10: A schematic illustration of an interlocking layered membrane formed onto an secondary battery electrode according to the present description.

FIG. 10: A schematic illustration of an interlocking layered membrane formed onto an secondary battery electrode, where in the ionic conductive membrane (022) is sprayed onto a secondary battery electrode (024) preformed on a current collector (026).

Figure 11A:
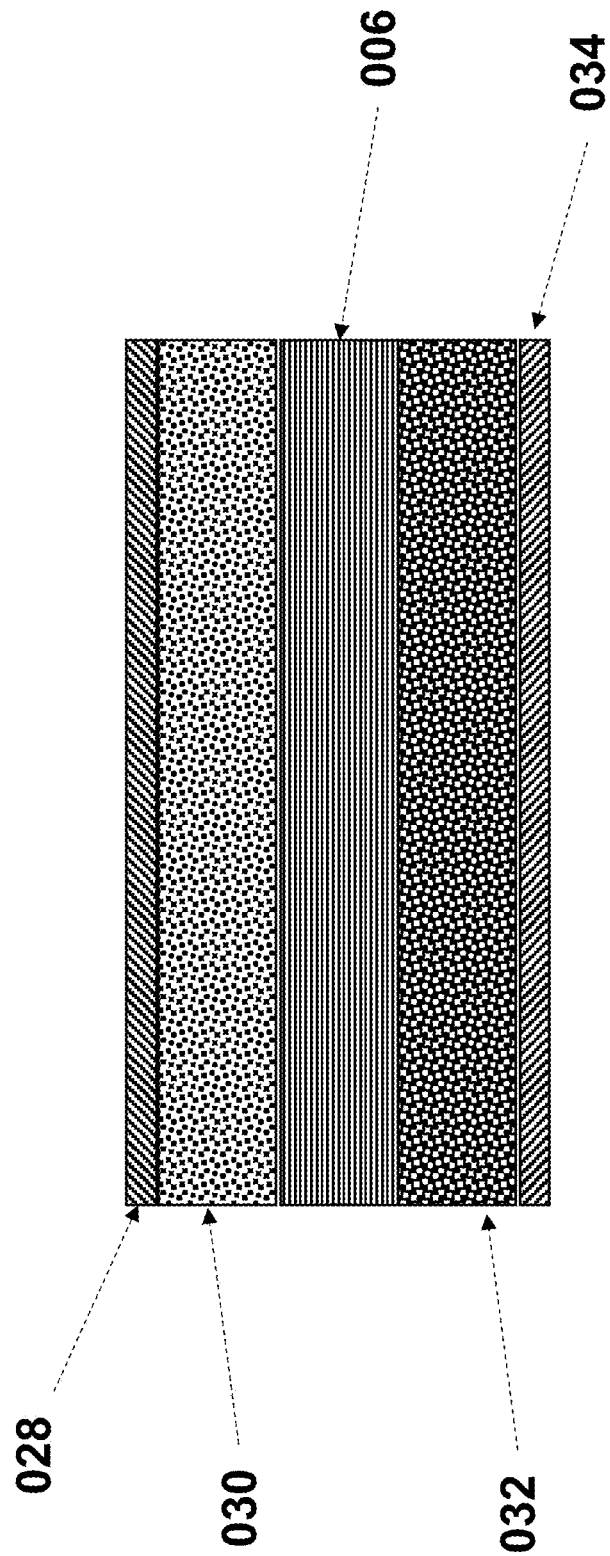
FIG. 11A: A schematic illustration of a secondary battery includes interlocking layered membrane according to the present description, wherein the ionic conductive membrane is a freestanding interlocking layered membrane.

FIG. 11A: A schematic illustration of a secondary battery includes interlocking layered membrane, wherein the ionic conductive membrane is a freestanding interlocking layered membrane (006) assembled between a negative secondary battery electrode (030), coated on a negative electrode current collector (028), and a positive secondary battery electrode (032), coated on a positive electrode current collector (034).

Figure 11B:
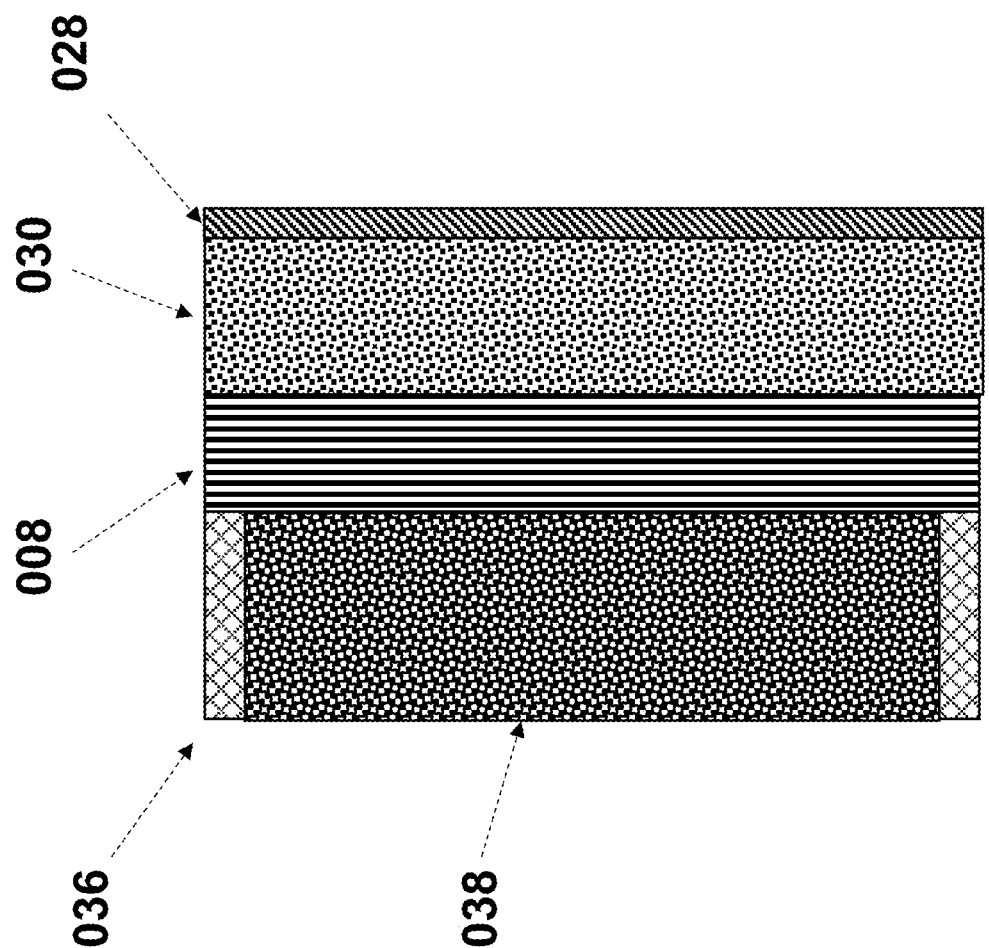
FIG. 11B: A schematic illustration of a secondary battery includes an interlocking layered membrane according to the present description, wherein the ionic conductive membrane is supported on a porous supporting substrate.

FIG. 11B: A schematic illustration of a secondary battery includes an interlocking layered membrane, wherein the ionic conductive membrane is supported on a porous supporting substrate (008), and the porous supporting substrate is an electrically conductive porous supporting substrate (036) prefilled with an embedded secondary battery positive electrode (038). The electrically conductive porous supporting substrate may be electrically conductive itself or conformally coated with a conformally coated electrically conductive material. After spraying, the secondary battery is assembled with a negative secondary battery electrode (030) coated on a negative current collector (028).

Figure 11C:
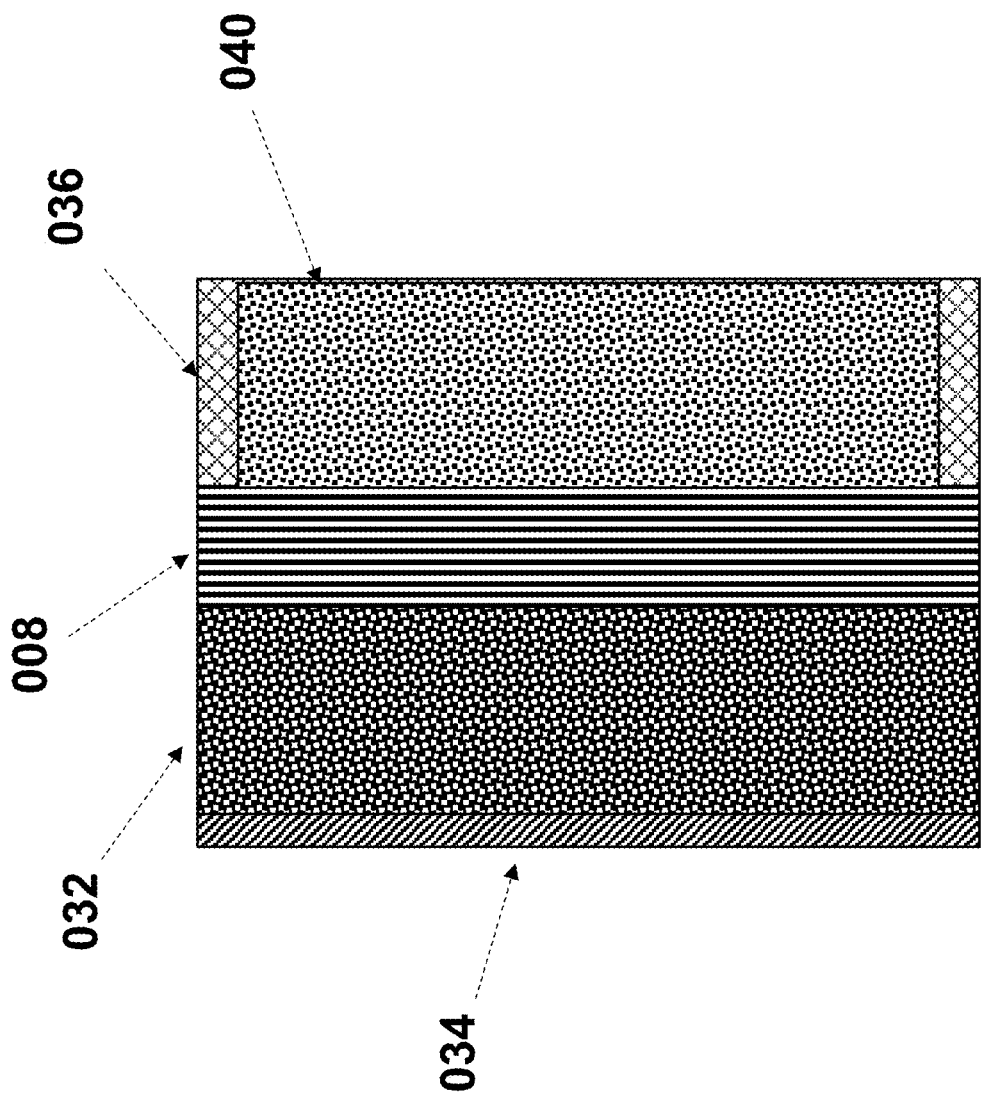
FIG. 11C: A schematic illustration of a secondary battery includes an interlocking layered membrane according to the present description, wherein the ionic conductive membrane is supported on a porous supporting substrate.

FIG. 11C: A schematic illustration of a secondary battery includes an interlocking layered membrane, wherein the ionic conductive membrane is supported on a porous supporting substrate (008), and the porous supporting substrate is an electrically conductive porous supporting substrate (036) prefilled with an embedded secondary battery negative electrode (040). The electrically conductive porous supporting substrate may be electrically conductive itself or conformally coated with a conformally coated electrically conductive material. After spraying, the secondary battery is assembled with a positive secondary battery electrode (032) coated on a positive current collector (034).

Figure 11D:
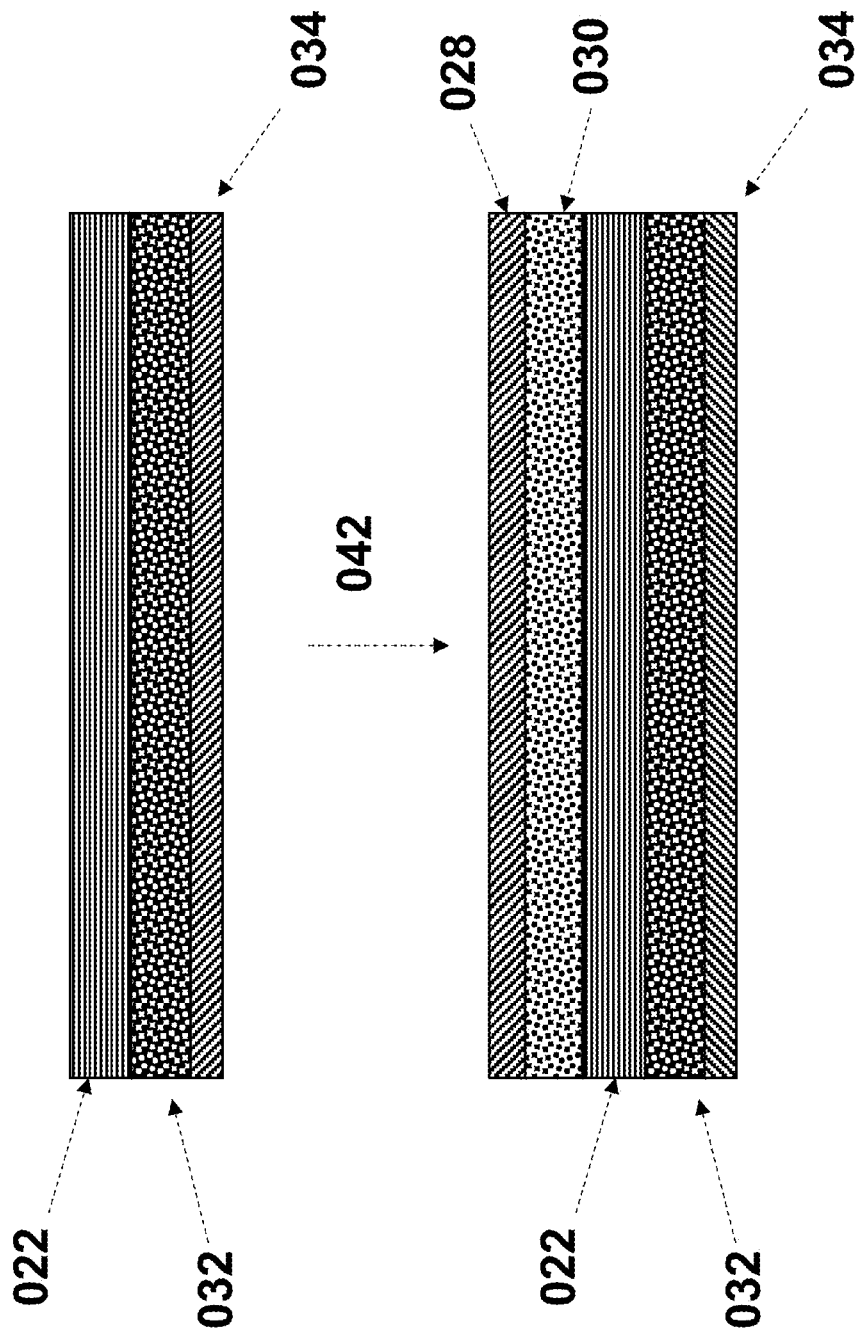
FIG. 11D: A schematic illustration of a secondary battery includes an interlocking layered membrane according to the present description, wherein the ionic conductive membrane is formed on a secondary battery electrode.

FIG. 11D: A schematic illustration of a secondary battery includes an interlocking layered membrane, wherein the ionic conductive membrane is formed on a secondary battery electrode (022), and the secondary battery electrode is a positive secondary battery electrode (032) coated onto a positive current collector (034). After spraying, the secondary battery is assembled (042) with a negative secondary battery electrode (030) coated on a negative current collector (028).

Figure 11E:
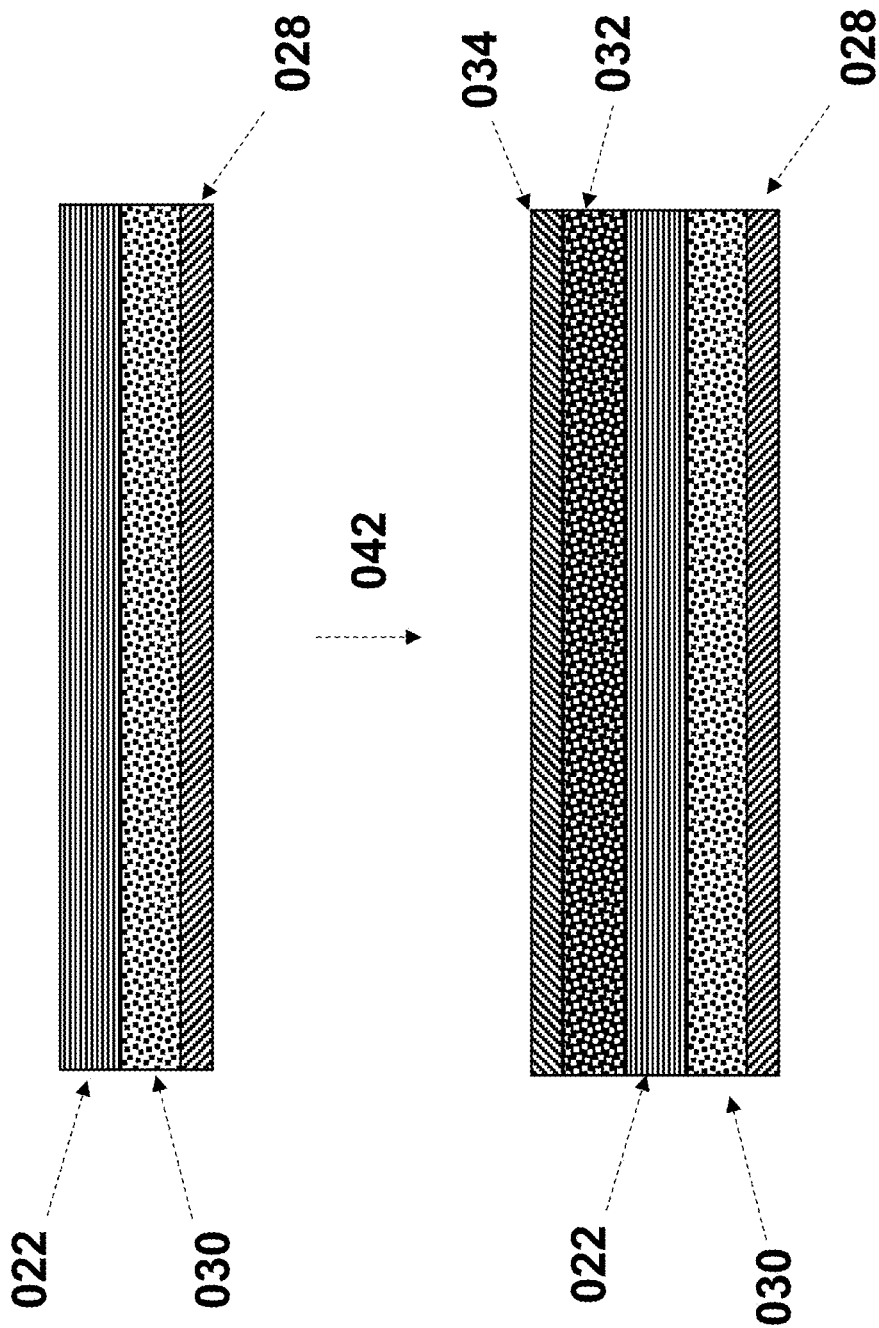
FIG. 11E: A schematic illustration of a secondary battery includes an interlocking layered membrane according to the present description, wherein the ionic conductive membrane is formed on a secondary battery electrode.

FIG. 11E: A schematic illustration of a secondary battery includes an interlocking layered membrane, wherein the ionic conductive membrane is formed on a secondary battery electrode (022), and the secondary battery electrode is a negative secondary battery electrode (030) coated onto a negative current collector (028). After spraying, the secondary battery is assembled (042) with a positive secondary battery electrode (032) coated on a positive current collector (034).

Figure 12A:
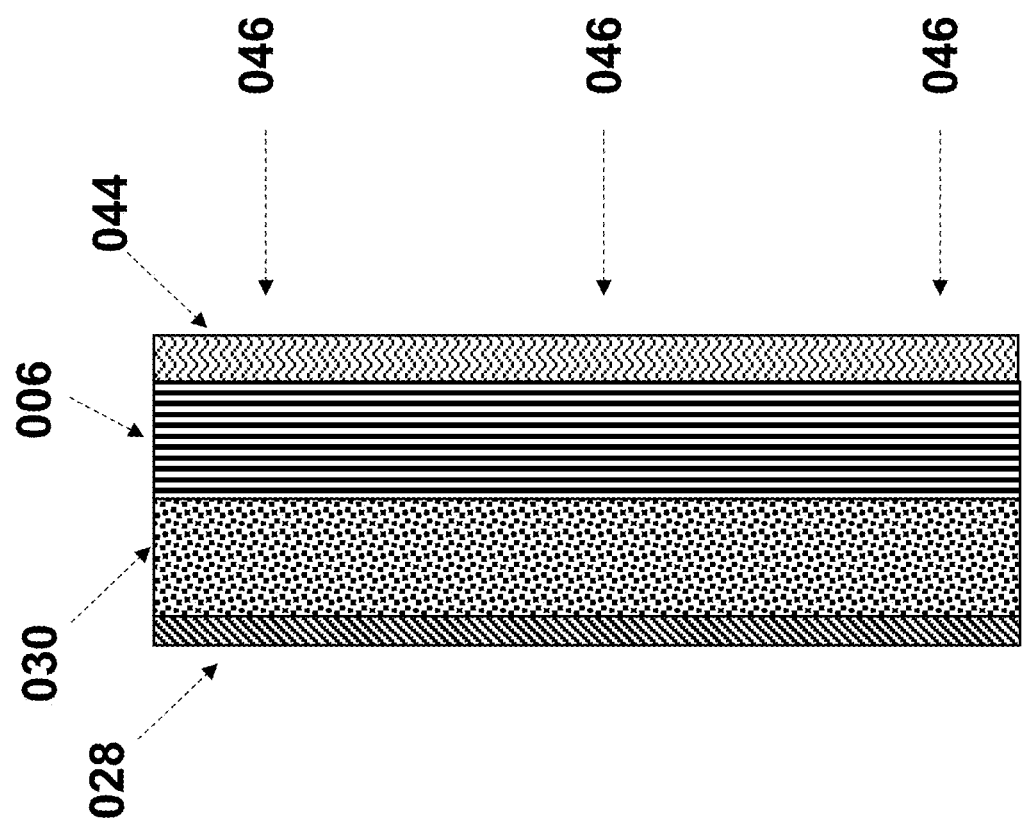
FIG. 12A: A schematic illustration of an air battery includes an interlocking layered membrane according to the present description, wherein the ionic conductive membrane is a freestanding interlocking layered membrane.

FIG. 12A: A schematic illustration of an air battery includes an interlocking layered membrane, wherein the ionic conductive membrane is a freestanding interlocking layered membrane (006) assembled between a negative air battery, or secondary battery, electrode (030) coated onto a negative current collector (028), and a porous positive electrode containing a catalyst (044) which can allow oxygen gas or atmosphere (046) to enter the system and react accordingly. Alternatively, the ionic conductive membrane may be formed onto the negative air battery electrode.

Figure 12B:
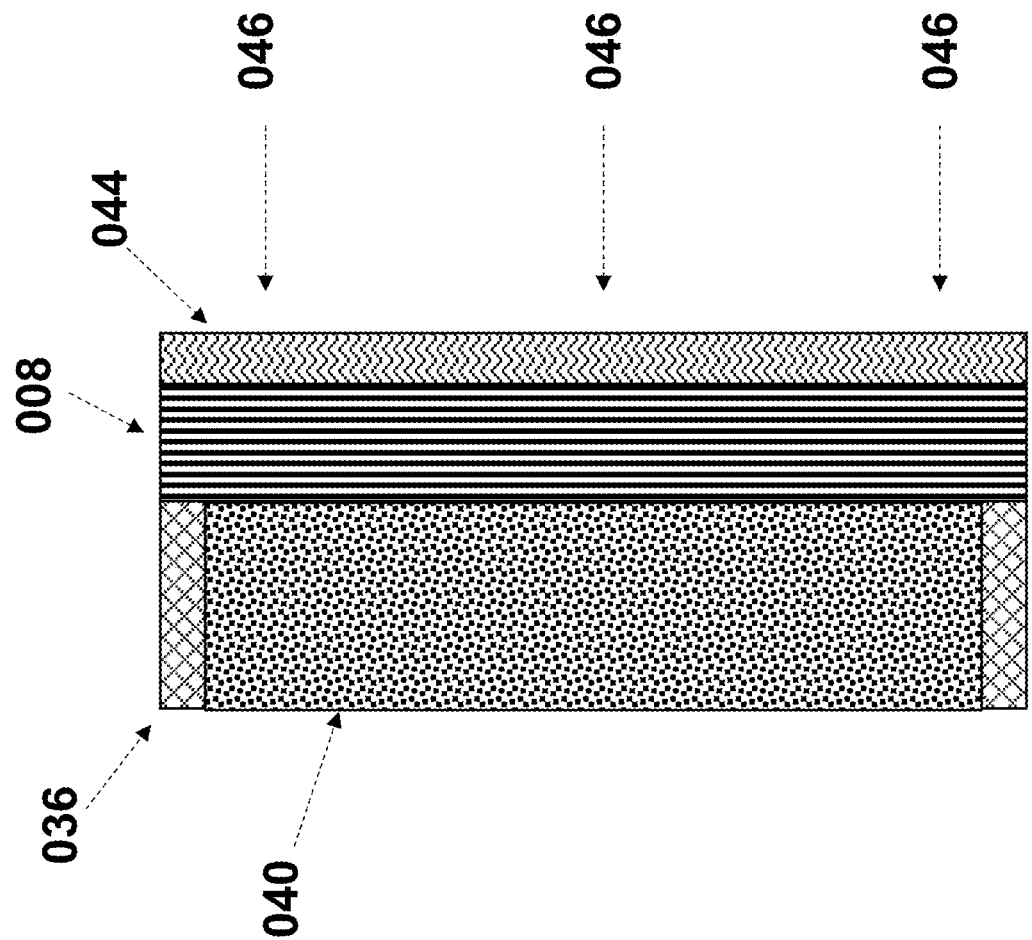
FIG. 12B: A schematic illustration of an air battery includes an interlocking layered membrane according to the present description, wherein the ionic conductive membrane is supported on a porous supporting substrate.

FIG. 12B: A schematic illustration of an air battery includes an interlocking layered membrane, wherein the ionic conductive membrane is supported on a porous supporting substrate (008), and the porous supporting substrate is an electrically conductive porous supporting substrate (036) prefilled with an embedded air battery, or secondary battery, negative electrode (040). The electrically conductive porous supporting substrate may be electrically conductive itself or conformally coated with a conformally coated electrically conductive material. After spraying the air battery is assembled with a porous positive electrode containing a catalyst (044) which can allow oxygen gas or atmosphere (046) to enter the system and react accordingly.

Figure 12C:
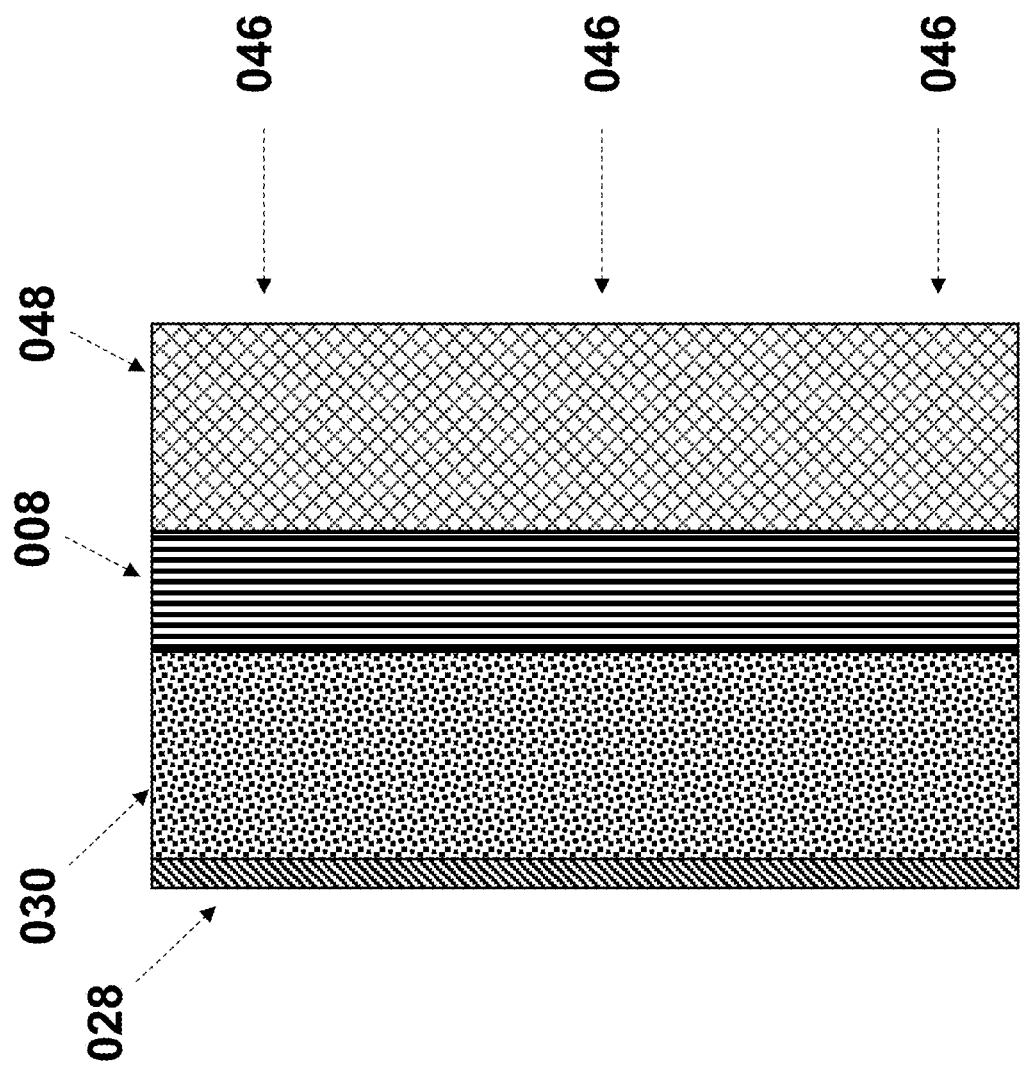
FIG. 12C: A schematic illustration of an air battery includes interlocking layered membrane according to the present description, wherein the ionic conductive membrane is supported on a porous supporting substrate.

FIG. 12C: A schematic illustration of an air battery includes interlocking layered membrane, wherein the ionic conductive membrane is supported on a porous supporting substrate (008), and the porous supporting substrate is an electrically conductive porous supporting substrate coated with a catalyst (048) which can allow oxygen gas or atmosphere (046) to enter the system and react accordingly. After spraying, the air battery is assembled with an air battery, or secondary battery, negative electrode (030) coated on a negative current collector (028).

Figure 13:
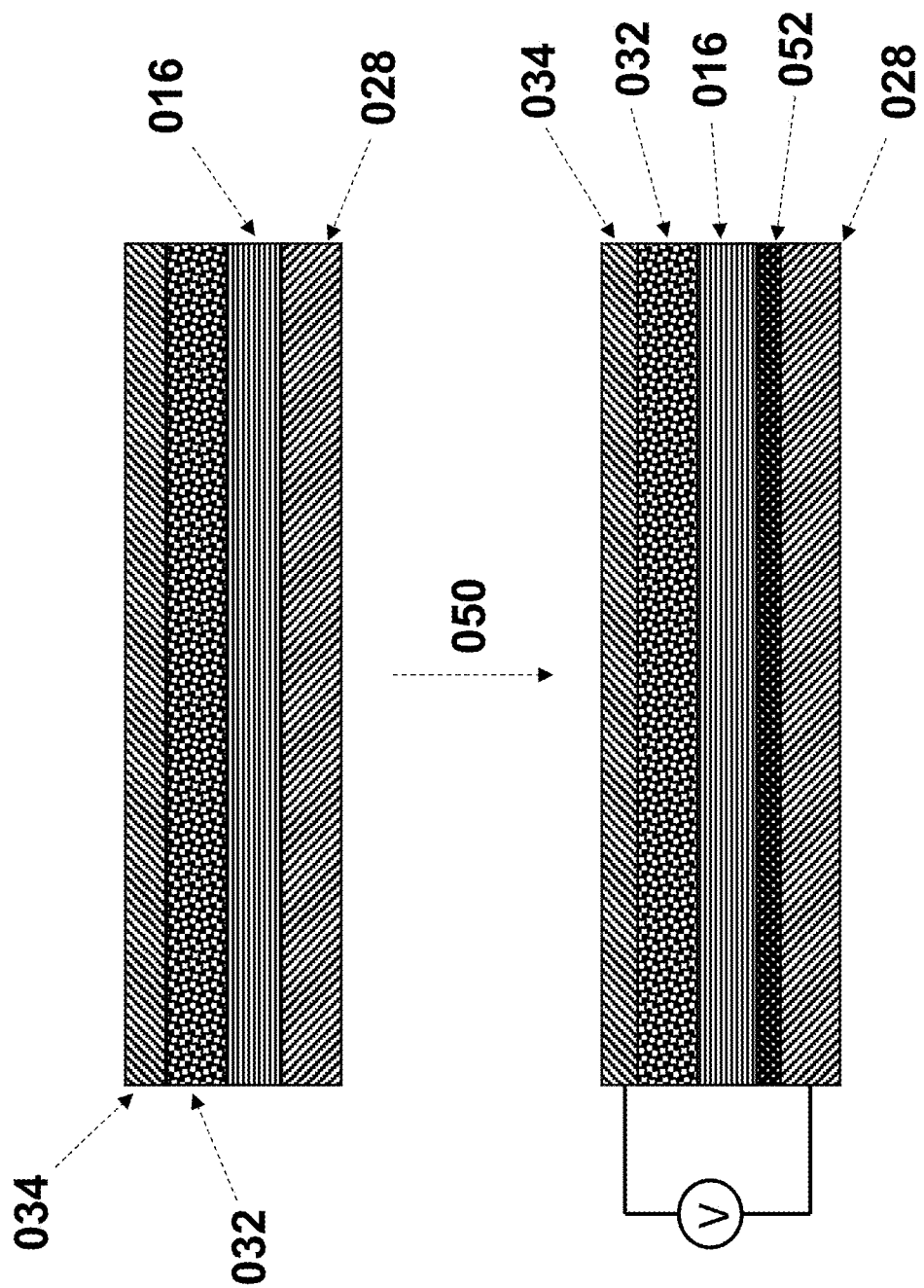
FIG. 13: A schematic illustration of an anodeless secondary battery composed of an interlocking layered membrane according to the present description, wherein the solid-state ionic conductive membrane is formed onto a flat substrate.

FIG. 13: A schematic illustration of an anodeless secondary battery composed of an interlocking layered membrane, wherein the solid-state ionic conductive membrane is formed onto a flat substrate (016), and the flat substrate is a negative current collector (028). After spraying, the anodeless battery is assembled with a positive secondary electrode (032) coated onto a positive current collector (034). A bias (050) is applied to the assembled anodeless battery forming a metal anode layer (052) between the interlocking layered membrane (016) and the negative current collector (028).

FIG. 14A: A schematic illustration of a flow type secondary battery includes an interlocking layered membrane, wherein the ionic conductive membrane is a freestanding interlocking layered membrane (006) separating the analyte (058) and catholyte (060). On the anolyte side, opposite of the freestanding membrane, is the flow type secondary battery negative electrode (054) coated on a negative current collector (028). On the catholyte side, opposite of the freestanding membrane, is the flow type secondary battery positive electrode (056) coated on a positive current collector (034).

Figure 14B:
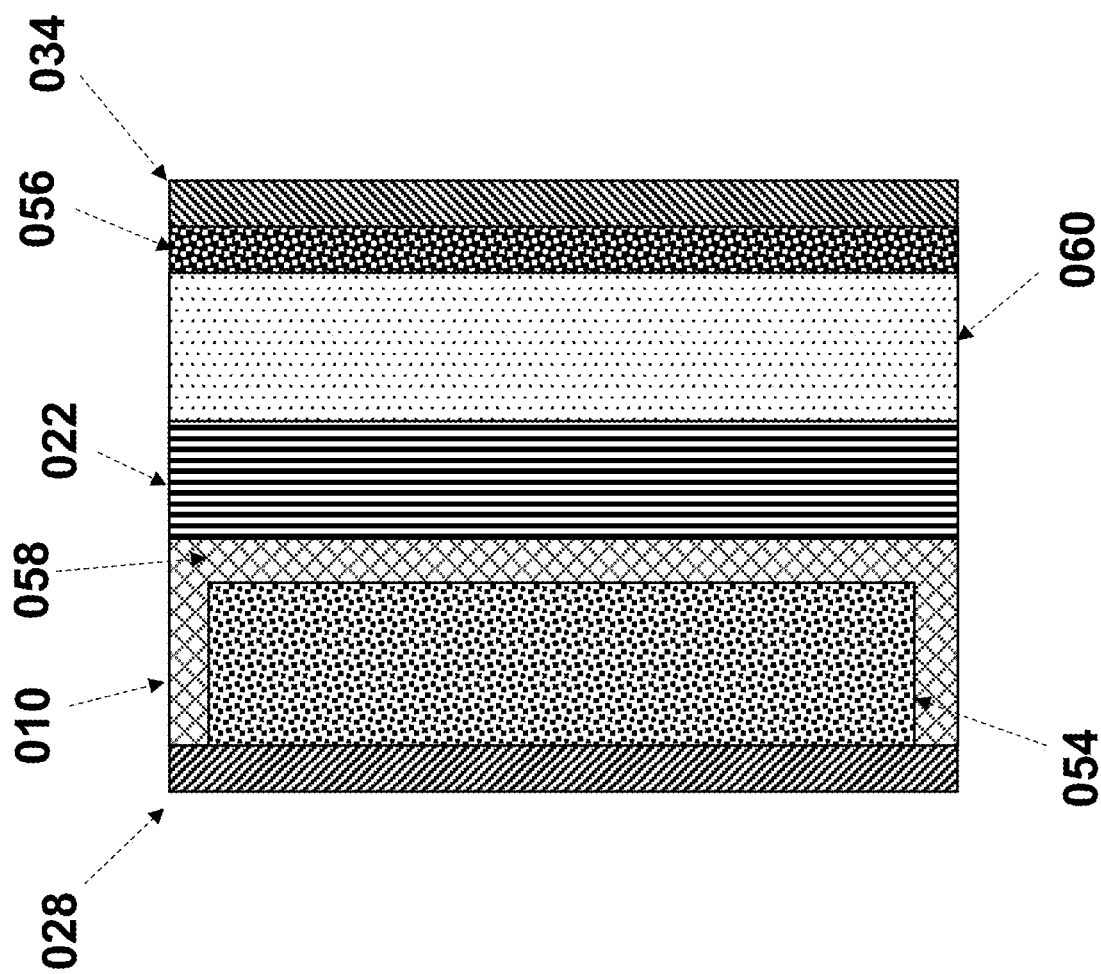
FIG. 14B: A schematic illustration of a flow type secondary battery including an interlocking layered membrane according to the present description, wherein the ionic conductive membrane is supported on a porous supporting substrate.

FIG. 14B: A schematic illustration of a flow type secondary battery includes an interlocking layered membrane, wherein the ionic conductive membrane is supported on a porous supporting substrate (008), and the porous supporting substrate (010) is prefilled with an embedded flow type secondary battery negative electrode (054) and a negative current collector (028) on the opposite end of said supporting substrate. Alternatively, the porous supporting substrate is an electrically conductive porous substrate (036), or insulative with a conformally coated conductive layer, wherein the flow type secondary battery negative electrode is conformally coated onto the supporting porous substrate. The anolyte (058) is preferably added after the spraying and assembly of the flow type secondary battery. Opposite of the ionic conductive membrane is the catholyte (060) and the flow type secondary battery positive electrode (056) coated on a positive current collector (034).

Figure 14C:
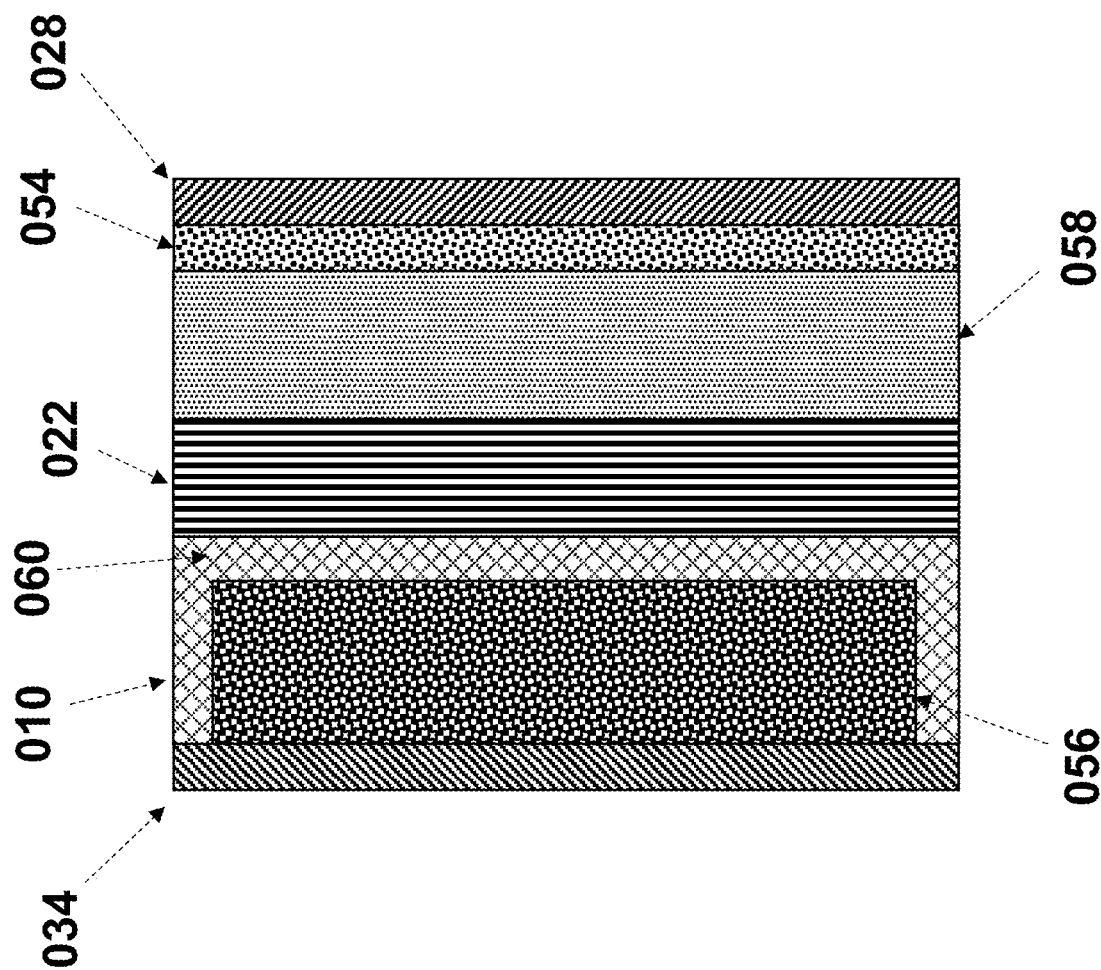
FIG. 14C: A schematic illustration of a flow type secondary battery including an interlocking layered membrane according to the present description, wherein the ionic conductive membrane is supported on a porous supporting substrate.

FIG. 14C: A schematic illustration of a flow type secondary battery includes an interlocking layered membrane, wherein the ionic conductive membrane is supported on a porous supporting substrate (008), and the porous supporting substrate (010) is prefilled with an embedded flow type secondary battery positive electrode (056) and a positive current collector (034) on the opposite end of said supporting substrate. Alternatively, the porous supporting substrate is an electrically conductive porous substrate (036), or insulative with a conformally coated conductive layer, wherein the flow type secondary battery positive electrode is conformally coated onto the supporting porous substrate. The catholyte (060) is preferably added after the spraying and assembly of the flow type secondary battery. Opposite of the ionic conductive membrane is the anolyte (058) and the flow type secondary battery negative electrode (054) coated on a negative current collector (028).

FIG. 14D: A schematic illustration of a flow type secondary battery includes an interlocking layered membrane, wherein the ionic conductive membrane is formed onto a preformed battery electrode (022), and the preformed battery electrode is a metal or metal alloy anode (062) formed onto a negative current collector (028). Opposite of the ionic conductive membrane is the catholyte (060) and the flow type secondary battery positive electrode (056) coated on a negative current collector (034).

With reference to the drawings, examples may include one or more of the following.

Example 1: Fabrication of a Freestanding Interlocking Layered Membrane

In an example, a freestanding interlocking layered membrane may be formed using thermal spraying, wherein an ionic conducting material is sprayed onto a removable substrate.

In an aspect, the thermal spray technique may be referred to as plasma spraying.

In an aspect, the ionic conducting material may be lithium lanthanum zirconia oxide or LLZO, wherein the LLZO is doped with a stabilizing element such as aluminum (Al-LLZO) and has a D50 particle size in the range of 1 to 100 μm in diameter.

In an aspect, the removable substrate is composed of a salt such as sodium chloride which can be dissolved in water after spraying is complete.

In an aspect, a spray distance between the plasma gun and the salt substrate may be in the range of 5 to 25 cm.

In an aspect, a carrier gas may be an inert gas such as helium.

In an aspect, the plasma energy and flow rate are governed by external parameters such tank pressure, regulator, gun type, etc., and hence may be adjusted at the time of spraying to achieve optimal spray conditions.

In an aspect, the plasma spraying may be done in raster fashion over the salt substrate, with the number of passes, or iterations, between 2 and 50.

A cross-sectional scanning electron microscopy image of a freestanding LLZO (Al-doped) interlocking layered membrane is presented in FIG. 1C.

Digital images of a freestanding LLZO (Al-doped) interlocking layered membrane is presented in FIG. 4.

An X-ray diffraction pattern of the plasma sprayed LLZO (Al-doped) is presented in FIG. 6, confirming the LLZO composition.

Example 2: Fabrication of an Interlocking Layered Membrane on a Porous Substrate In an example, an interlocking layered membrane may be formed onto a substrate using thermal spraying, wherein an ionic conducting material is sprayed onto a porous supporting substrate.

In an aspect, the thermal spray technique may be referred to as plasma spraying.

In an aspect, the ionic conducting material may be lithium lanthanum zirconia oxide or LLZO, wherein the LLZO is doped with a stabilizing element such as tantalum and has a D50 particle size in the range of 1 to 100 μm in diameter.

In an aspect, the porous supporting substrate may be bare nickel foam.

In an aspect, a spray distance between the plasms gun and the porous substrate may be in the range of 10 to 30 cm.

In an aspect, a spray angle, with respect to the surface of the porous substrate, may be in the range of 5 to 45°.

In an aspect, a carrier gas may be an inert gas such as helium.

In an aspect, the plasma energy and flow rate are governed by external parameters, and hence may be adjusted at the time of spraying to achieve optimal spray conditions.

In an aspect, the plasma spraying may be done in raster fashion over the salt substrate, with the number of passes, or iterations, between 2 and 50.

A cross-sectional scanning electron microscopy image of an LLZO (Ta-doped) interlocking layered membrane supported on nickel foam is presented in FIG. 5A.

A digital image of an LLZO (Ta-doped) interlocking layered membrane supported on nickel foam is presented in FIG. 5B.

Example 3: An Interlocking Layered Membrane in a Gel Polymer Secondary Battery In an aspect, an interlocking layered membrane may be used in gel polymer secondary battery, wherein the secondary battery contains an ionic conducting gel polymer in addition to the ion conducting layered membrane.

In an example, an interlocking layered membrane may be formed onto a porous positive current collector. After the formation of the layered membrane, the porous positive current collector may be filled with a cathode and an ion conducting gel polymer. A lithium metal anode may be formed onto the opposite side of the interlocking layered membrane. A schematic illustration of the example is shown in FIG. 11B.

In an aspect, an interlocking layered membrane may be composed of Argyrodite ($Li_6PS_5Cl$)

In an aspect, a porous positive current collector may be a porous aluminum foam.

In an aspect, a cathode may be composed of lithium cobalt oxide ($LiCoO_2$) as the active electrode material, carbon black as the electronic conducting media, and polyvinylidene fluoride as the binder.

In an aspect, an ionic conducting gel polymer may be composed of polyethylene glycol (PEO) and a lithium salt.

In an aspect, the lithium metal anode may be deposed onto the layered membrane using evaporation. Alternatively, the lithium metal anode, coated onto a negative current collector, may be pressed onto the layered membrane.

In an aspect, the Argyrodite may be coated with a protective layer prior to the formation of a lithium layer to enhancing cyclability. Alternatively, the lithium metal anode may be coated with a protective layer prior to pressing onto the Argyrodite.

In the scenario of pressing a lithium metal onto Argyrodite, a liquid electrolyte may be added at the interface between the lithium anode and Argyrodite.

In another example, an interlocking layered membrane may be formed onto a porous negative current collector. After the formation of the layered membrane, the porous negative current collector may be filled with an anode and an ion conducting gel polymer. A cathode may be formed onto the opposite side of the interlocking layered membrane with a gel polymer at the interface. A schematic illustration of the example is shown in FIG. 11C.

In an aspect, an interlocking layered membrane may be composed of NASICON-structured LAGP ($Li_{1-x}Al_xGe_{2-x}(PO_4)_3$).

In an aspect, a porous negative current collector may be a porous copper foam.

In an aspect, an anode may be composed of silicon as the active electrode material, carbon black as the electronic conducting media, and styrene-butadiene rubber as the binder. The voids of the copper foam may enable the volume expansion of the silicon. In addition, the silicon may be coated with a protective layer.

In an aspect, an ionic conducting gel polymer may be composed of poly(vinylidene fluoride)-co-hexafluoropropylene (PVDF-HFP), lithium salt, and an organic-based liquid electrolyte.

In an aspect, a cathode may be composed of lithium manganese oxide (LiMnO$_4$) as the active electrode material, carbon black as the electronic conducting media, styrene-butadiene rubber as the binder, coated onto an aluminum foil current collector.

In an aspect, an ionic conducting gel polymer may be composed of poly(vinylidene fluoride)-co-hexafluoropropylene (PVDF-HFP), lithium salt, and an organic-based liquid electrolyte may be used at the cathode/layered membrane interface.

In yet another example, an interlocking layered membrane may be freestanding and assembled into a gel polymer battery, wherein an ionic conducting gel polymer is applied on both sides of the layered membrane at the interface of both the anode and cathode. A schematic illustration of the example is shown in FIG. 11A.

In an aspect, an interlocking layered membrane may be composed of niobium doped lithium lanthanum zirconium oxide (Nb-LLZO).

In an aspect, an anode may be composed of graphite as the active electrode material, carbon black as the electronic conducting media, and polyvinylidene fluoride as the binder, coated onto a copper current collector.

In an aspect, a cathode may be composed of lithium iron phosphate (LiFePO$_4$) as the active electrode material, carbon black as the electronic conducting media, and polyvinylidene fluoride as the binder, coated onto an aluminum current collector.

In an aspect, an ionic conducting gel polymer may be composed of polyacrylonitrile (PAN), a lithium salt, and an organic-based liquid electrolyte.

In yet another example, an interlocking layered membrane may be formed directly onto a lithium metal surface, wherein an ionic conducting gel polymer is applied on the opposite side at the cathode/layered membrane interface. A schematic illustration of the example is shown in FIG. 11E.

In an aspect, an interlocking layered membrane may be composed of thiophosphate glass-ceramic or LPS (Li$_3$PS$_4$) thermally sprayed onto lithium metal.

In an aspect, lithium metal, or a lithium metal alloy, may be coated onto stainless steel foil as to not react with sulfide in the LPS.

In an aspect, the lithium metal, or lithium metal alloy, may coated with a protective layer prior to the thermal spraying of LPS.

In an aspect, a cathode may be composed of lithium nickel cobalt manganese oxide (NCM-811) as the active electrode material, carbon black as the electronic conducting media, and polyvinylidene fluoride as the binder, coated onto an aluminum current collector.

In an aspect, an ionic conducting gel polymer may be composed of polyethylene glycol (PEO), a lithium salt, and an organic-based liquid electrolyte.

Example 4: An Interlocking Layered Membrane in a Hybrid/Semi-Solid Secondary Battery In an aspect, an interlocking layered membrane may be used in a hybrid or semi-solid secondary battery, wherein the secondary battery contains on ionic conducting liquid electrolyte in addition to the ion conducting layered membrane.

In an example, an interlocking layered membrane may be formed onto a porous positive current collector. After the formation of the layered membrane, the porous positive current collector may be filled with a cathode and a liquid electrolyte. A lithium metal anode may be formed onto the opposite side of the interlocking layered membrane. A schematic illustration of the example is shown in FIG. 11B.

In an aspect, an interlocking layered membrane may be composed of thiophosphate glass-ceramic or LPS (Li$_3$PS$_4$).

In an aspect, a porous positive current collector may be a porous aluminum foam.

In an aspect, a cathode may be composed of lithium cobalt oxide (LiCoO$_2$) as the active electrode material, carbon black as the electronic conducting media, and polyvinylidene fluoride as the binder.

In an aspect, a liquid electrolyte may be a dual salt organic-based liquid electrolyte system such as 2M lithium bis(trifluoromethanesulfonyl)imide (LiTFSI)+lithium difluoro(oxalato)borate (LiDFOB) in dimethyl ether (DME).

In an aspect, the lithium metal, or lithium metal alloy, anode may be deposed onto the layered membrane using evaporation. Alternatively, the lithium metal anode, or lithium metal alloy, coated onto a negative current collector, may be pressed onto the layered membrane.

In an aspect, the LPS may be coated with a protective layer prior to the formation of a lithium layer to enhancing cyclability. Alternatively, the lithium metal anode may be coated with a protective layer prior to pressing onto the LPS.

In the scenario of pressing a lithium metal onto LPS, a liquid electrolyte may be added at the interface between the lithium anode and LPS.

In another example, an interlocking layered membrane may be formed onto a porous negative current collector. After the formation of the layered membrane, the porous negative current collector may be filled with an anode and a liquid electrolyte. A cathode may be formed onto the opposite side of the interlocking layered membrane with a liquid electrolyte at the interface. A schematic illustration of the example is shown in FIG. 11C.

In an aspect, an interlocking layered membrane may be composed of sulfide solid electrolyte Thio-LISICON LGPS (Li$_{10}$GeP$_2$Si$_2$)

In an aspect, a porous negative current collector may be a porous copper foam.

In an aspect, an anode may be composed of silicon as the active electrode material, carbon black as the electronic conducting media, and styrene-butadiene rubber as the binder. The voids of the copper foam may enable the volume expansion of the silicon. In addition, the silicon may be coated with a protective layer.

In an aspect, a liquid electrolyte may be a dual salt organic-based liquid electrolyte system such as 2M lithium bis(trifluoromethanesulfonyl)imide (LiTFSI)+lithium difluoro(oxalato)borate (LiDFOB) in dimethyl ether (DME).

In an aspect, a cathode may be composed of lithium manganese oxide (LiMnO$_4$) as the active electrode material, carbon black as the electronic conducting media, styrene-butadiene rubber as the binder, coated onto an aluminum foil current collector.

In an aspect, a liquid electrolyte may be a dual salt organic-based liquid electrolyte system such as 2M lithium bis(trifluoromethanesulfonyl)imide (LiTFSI)+lithium difluoro(oxalato)borate (LiDFOB) in dimethyl ether (DME). may be used at the cathode/layered membrane interface.

In yet another example, an interlocking layered membrane may be freestanding and assembled into a hybrid or semi-solid secondary battery, wherein an ionic conducting liquid electrolyte is applied on both sides of the layered membrane at the interface of both the anode and cathode. A schematic illustration of the example is shown in FIG. 11A.

In an aspect, an interlocking layered membrane may be composed of an Argyrodite with a mixed halogen formulation ($Li_6PS_5Cl_xBr_y[X+Y=1]$).

In an aspect, an anode may be composed of graphite as the active electrode material, carbon black as the electronic conducting media, and polyvinylidene fluoride as the binder, coated onto a copper current collector.

In an aspect, a cathode may be composed of lithium iron phosphate ($LiFePO_4$) as the active electrode material, carbon black as the electronic conducting media, and polyvinylidene fluoride as the binder, coated onto an aluminum current collector.

In an aspect, a liquid electrolyte may be a dual salt organic-based liquid electrolyte system such as 2M lithium bis(trifluoromethanesulfonyl)imide (LiTFSI)+lithium difluoro(oxalato)borate (LiDFOB) in tetraethylene glycol dimethyl ether (TEGDME).

In yet another example an interlocking layered membrane may be formed directly onto a lithium metal, or lithium metal alloy surface, wherein an ionic conducting liquid is applied on the opposite side at the cathode/layered membrane interface. A schematic illustration of the example is shown in FIG. 11E.

In an aspect an interlocking layered membrane may be composed of aluminum doped lithium lanthanum zirconium oxide (Al-LLZO) thermally sprayed onto lithium metal.

In an aspect, lithium metal, or a lithium metal alloy, may be coated onto copper or stainless-steel foil.

In an aspect, the lithium metal, or lithium metal alloy, may coated with a protective layer prior to the thermal spraying of Al-LLZO.

In an aspect, a cathode may be composed of lithium nickel cobalt manganese oxide (NCM-622) as the active electrode material, carbon black as the electronic conducting media, and polyvinylidene fluoride as the binder, coated onto an aluminum current collector.

In an aspect, a liquid electrolyte may include 1M lithium hexafluorophosphate in a mixture of ethylene carbonate, dimethyl carbonate, and diethyl carbonate (EC/DMC/DEC 1/1/1 ratio) with 2% vinylene carbonate (VC)

Example 5: An Interlocking Layered Membrane in a Solid-State Secondary Battery

In an aspect an interlocking layered membrane may be used in a solid-state secondary battery, wherein the secondary battery contains only solid-state ionic conducting materials as the sole ion conducting media.

In an example, an interlocking layered membrane may be freestanding and assembled into a solid-state secondary battery, wherein the secondary battery is composed of a composite cathode, a composite anode or lithium metal anode, and the layered membrane. A schematic illustration of the example is shown in FIG. 11A.

In an aspect, an interlocking layered membrane may be composed of a tantalum doped lithium lanthanum zirconium oxide.

In an aspect, a composite cathode may be composed of lithium nickel oxide ($LiNiO_2$) as the active electrode material, carbon black as the electronic conducting media, polyvinylidene fluoride as the binder, and polyethylene oxide (PEO) mixed with a lithium salt as the ionic conducting media, coated onto an aluminum current collector.

In an aspect, a composite anode may be composed of graphite as the active electrode material, carbon black as the electronic conducting media, polyvinylidene fluoride as the binder, and polyethylene oxide (PEO) mixed with a lithium salt as the ionic conducting media, coated onto a copper current collector.

In an aspect, and alternative of a composite anode, a lithium metal, or lithium metal alloy, anode may be coated with a protective layer to enhance cycle life.

In another example, an interlocking layered membrane may be sprayed or formed directly onto a lithium metal, or lithium metal alloy, surface, wherein a composite cathode is assembled on the opposite surface of the layered membrane. A schematic illustration of the example is shown in FIG. 11E.

In an aspect, an interlocking layered membrane may be composed of Argyrodite ($Li_6PS_5Cl$).

In an aspect, a composite cathode may be composed of lithium nickel cobalt aluminum oxide (NCA) as the active electrode material, carbon black as the electronic conducting media, polyvinylidene fluoride as the binder, and polyacrylonitrile (PAN) mixed with a lithium salt as the ionic conducting media, coated onto an aluminum current collector.

In an aspect, the lithium metal, or lithium metal alloy, anode may be coated on a stainless steel or aluminum foil current collector as to prevent the formation of copper sulfide.

In an aspect, the lithium metal, or lithium metal alloy, anode may be coated with a protective layer to enhancing cyclability prior to the formation of the interlocking layered structure.

In yet another example, an interlocking layered membrane may be sprayed or formed directly onto a composite cathode, wherein lithium metal, or lithium metal alloy, or a composite anode is assembled on the opposite surface of the layered membrane. A schematic illustration of the example is shown in FIG. 11D.

In an aspect, an interlocking layered membrane may be composed of NASICON-structured LAGP ($Li_{1-x}Al_xGe_{2-x}(PO_4)_3$).

In an aspect, a composite cathode may be composed of lithium nickel cobalt manganese oxide (NCM-811) as the active electrode material, carbon black as the electronic conducting media, polyvinylidene fluoride as the binder, and LAGP as the ionic conducting media, coated onto an aluminum current collector.

Alternatively, a thin layered cathode may be used as opposed to a composite cathode, wherein the thin layered cathode is a thin layer of active material, such as NCM-811, coated onto an aluminum current collector.

In an aspect, a composite anode may be composed of graphite as the active electrode material, carbon black as the electronic conducting media, polyvinylidene fluoride as the binder, and polyethylene oxide (PEO) mixed with a lithium salt as the ionic conducting media, coated onto a copper current collector.

In an aspect, and alternative of a composite anode, a lithium metal, or lithium metal alloy, anode may be coated with a protective layer to enhance cycle life.

In yet another example, an interlocking layered membrane may be sprayed or formed directly onto a composite anode, wherein a composite cathode is assembled on the opposite surface of the layered membrane. A schematic illustration of the example is shown in FIG. 11E.

In an aspect, an interlocking membrane may be composed of thiophosphate glass-ceramic or LPS ($Li_3PS_4$).

In an aspect, a composite anode may be composed of graphite as the active electrode material, carbon black as the electronic conducting media, styrene-butadiene rubber as the binder, and LPS as the ionic conducting media, coated onto a stainless steel or aluminum current collector.

Alternatively, a thin layered anode may be used as opposed to a composite anode, wherein the thin layered anode is a thin layer of active material, such as titanium oxide, coated onto a copper current collector.

In an aspect, a composite cathode may be composed of lithium nickel cobalt manganese oxide (NCM-622) as the active electrode material, carbon black as the electronic conducting media, styrene-butadiene rubber as the binder, and LPS as the ionic conducting media, coated onto an aluminum current collector.

Example 6: An Interlocking Layered Membrane in a Metal-Sulfur Secondary Battery

In an aspect, an interlocking layered membrane may be used in a metal-sulfur secondary battery, wherein the secondary battery contains a metal anode, sulfur anode, and a layered membrane.

In an example, an interlocking layered membrane may be sprayed onto a lithium metal, or lithium metal alloy, anode, wherein the secondary battery is a lithium-sulfur secondary battery. A schematic illustration of the example is shown in FIG. 11E.

In an aspect, an interlocking layered membrane may be composed of Argyrodite ($Li_6PS_5Cl$) or an Argyrodite with a mixed halogen ratio.

In an aspect, the lithium metal, or lithium metal alloy, anode may be coated with a protective layer to enhancing cycling.

In an aspect, a sulfur-based cathode may be assembled onto the opposite side of the layered membrane. And the sulfur may be encapsulated in an open material such as carbon nanotubes.

In an aspect, the sulfur-based cathode may be a composite based cathode in the case of solid-state sulfur battery, wherein argyrodite acts as a lithium ion conducting media.

In an aspect, the lithium-metal sulfur battery may use a gel polymer or liquid electrolyte to further facilitate lithium transport in the cathode.

In an example, an interlocking layered membrane may be sprayed onto a sodium metal, or sodium metal alloy, anode, wherein the secondary battery is a sodium-sulfur secondary battery. A schematic illustration of the example is shown in FIG. 11E In an aspect, an interlocking layered membrane may be composed of sodium-based Argyrodite ($Na_6PS_5Cl$) or an Argyrodite with a mixed halogen ratio.

In an aspect, a sodium metal, or sodium metal alloy, anode may be coated with a protective layer to enhancing cycling.

In an aspect, a sulfur-based cathode may be assembled onto the opposite side of the layered membrane. And the sulfur may be encapsulated in an open material such as carbon nanotubes.

In an aspect, the sulfur-based cathode may be a composite based cathode in the case of solid-state sulfur battery, wherein sodium-based Argyrodite acts as an ionic conducting media.

In an aspect, the sodium-metal sulfur battery may use a gel polymer or liquid electrolyte to further facilitate sodium transport in the cathode.

In an example, an interlocking layered membrane may be sprayed onto a porous positive current collector, wherein the porous collector is encapsulated with sulfur following the formation of the layered membrane. A schematic illustration of the example is shown in FIG. 11B.

In an aspect, an interlocking layered membrane may be composed of sulfide solid electrolyte Thio-LISICON LGPS ($Li_{10}GeP_2Si_2$)

In an aspect, a positive current collector may be composed of aluminum foam.

In an aspect, a positive current collector, encapsulated with sulfur, maybe further encapsulated with an electronic conducting polymer such as poly(3,4-ethylenedioxythiophene (PEDOT).

In an aspect, the metal, or metal alloy, anode may be deposed onto the layered membrane using evaporation. Alternatively, the metal, or metal alloy, anode coated onto a negative current collector, may be pressed onto the layered membrane.

In an aspect, the LGPS may be coated with a protective layer prior to the formation of a metal layer to enhancing cyclability. Alternatively, the metal anode may be coated with a protective layer prior to pressing onto the LGPS.

In the scenario of pressing a metal anode onto LGPS, a liquid electrolyte may be added at the interface between the metal anode and LPS.

In an example, an interlocking layered membrane may be freestanding, wherein it is assembled between a metal anode and a sulfur-based cathode. A schematic illustration of the example is shown in FIG. 11A.

In an aspect, a freestanding interlocking layered membrane may be composed of thiophosphate glass-ceramic or LPS ($Li_3PS_4$).

In an aspect, a sulfur-based cathode, coated onto aluminum foil, may be assembled into the metal sulfur batter. And the sulfur may be encapsulated in an open material such as carbon nanotubes.

In an aspect, the sulfur-based cathode may be a composite based cathode in the case of solid-state sulfur battery, wherein LPS acts as an ionic conducting media.

In an aspect, the metal sulfur battery may use a gel polymer or liquid electrolyte to further facilitate sodium transport in the cathode.

In an aspect, the metal, or metal alloy, anode may be coated onto a stainless steel or In aluminum foil current collector, as to avoid the production of copper sulfide.

In an aspect, the metal, or metal alloy, anode may be coated with a protective layer to enhancing cyclability Example 7: An Interlocking Layered Membrane in an Air-Type Battery In an aspect, an interlocking layered membrane may be used in an air type battery, such as a lithium air secondary battery, wherein the secondary battery contains an anode, a layered membrane, and a porous cathode containing a catalyst.

In an example, an interlocking layered membrane may be freestanding, wherein the layered membrane is assembled between a lithium metal anode and a porous cathode. A schematic illustration of the example is shown in FIG. 12A.

In an aspect, an interlocking layered membrane may be composed of niobium doped lithium lanthanum aluminum oxide (Nb-LLZO).

In an aspect, a porous cathode may be composed of a carbon material coated onto a mesh like structure such as an aluminum mesh.

In an aspect, a catalyst, such as platinum, may be coated onto, or mixed within, the carbon material.

In an aspect, the lithium metal, or lithium metal alloy, anode may be coated with a protective layer to enhancing cycling.

In an aspect, an ionic conducting liquid, or gel polymer, may be placed at the interfaces between the electrodes and Nb-LLZO.

In another example, an interlocking layered membrane may be formed onto a porous negative current collector containing an embedded anode material, wherein a porous cathode, containing a catalyst, is assembled onto the opposite surface of the layered membrane. A schematic illustration of the example is shown in FIG. 12B.

In an aspect, an interlocking layered membrane may be composed of NASICON-structured LAGP ($Li_{1-x}Al_xGe_{2-x}(PO_4)_3$).

In an aspect, a negative porous current collector may include copper foam.

In an aspect, an anode material may include silicon as the active electrode material, a binder, and an electronic conductive additive such as carbon nanotubes.

In an aspect, an ionic conducting liquid, or gel polymer, may be placed at the interfaces between the porous cathode and LAGP.

In an aspect, a porous cathode, assembled on the opposite surface of the LAGP, may be composed of a carbon material coated onto a mesh like structure such as a steel mesh.

In an aspect, a catalyst, such as cobalt oxide, may be coated onto, or mixed within, the carbon material.

In an aspect, an ionic conducting gel polymer may be placed at the interfaces between the porous cathode and LAGP.

In yet another example, an interlocking layered membrane may be formed onto a porous cathode, wherein an anode can be assembled onto the opposite surface of the layered membrane.

A schematic illustration of the example is shown in FIG. 12C.

In an aspect, an interlocking layered membrane may be composed of a perovskite-type oxide such as $(Li,La)TiO_3$.

In an aspect, a porous cathode may first be formed onto a porous supporting substrate, and the porous supporting substrate may be composed aluminum foam.

In an aspect, a catalyst, such as manganese, may be coated onto, or mixed within, the carbon material.

In an aspect, an anode may be composed of graphite as the active electrode material, mixed with a binder and electronic additive.

In an aspect, an anode may be coated onto the layered membrane, or coated onto a current collector, such as copper, and assembled into an air battery.

In the scenario that the anode is coated onto a current collector, an ionic conducting liquid, or gel polymer, may be placed at the interface between the layered membrane and anode.

In an aspect, an alternative to the graphite, may be a lithium metal, or lithium metal alloy, anode.

In an aspect, a lithium metal, or lithium metal alloy, anode may be deposited onto the layered membrane using evaporation. In this scenario, the layered membrane may be coated with a protective layer to enhancing cycling.

In an aspect, a lithium metal, or lithium metal alloy, anode coated onto a current collector, such as copper foil, may be assembled into air battery. In this scenario, the metal surface may be coated with a protective layer to enhancing cycling.

In the scenario that the lithium metal, or lithium metal alloy, is coated onto a current collector, an ionic conducting liquid, or gel polymer, may be placed at the interface between the layered membrane and metal anode.

In yet another example, an interlocking layered membrane may be formed onto lithium metal anode, wherein a porous cathode, containing a catalyst, is assembled onto the opposite surface of the layered membrane. A schematic illustration of the example is shown in FIG. 12A.

In an aspect, an interlocking layered membrane may be composed of aluminum doped lithium lanthanum aluminum oxide (Al-LLZO).

In an aspect, the lithium metal, or lithium metal alloy, anode may be coated with a protective layer to enhancing cycling.

In an aspect, an ionic conducting liquid, or gel polymer, may be placed at the interfaces between the electrodes and Nb-LLZO.

In an aspect, a porous cathode may be composed of a carbon material coated onto a mesh like structure such as an aluminum mesh.

In an aspect, a catalyst, such as platinum, may be coated onto, or mixed within, the carbon material.

In an aspect, an ionic conducting gel polymer, may be placed at the interfaces between the porous cathode and Al-LLZO.

Example 8: An Interlocking Layered Membrane in an Aqueous or Seawater Battery

In an aspect, an interlocking layered membrane may be used in a seawater secondary battery, wherein the secondary battery contains an anode, a layered membrane, and seawater as the cathode or source for sodium ions.

In an example, an interlocking layered membrane is formed onto a sodium metal, or sodium alloy metal, anode surface, wherein the layered membrane protects the metal from the seawater. A schematic illustration of the example is shown in FIG. 11E.

In an aspect, an interlocking layered membrane structure is composed of sodium ion conducting NASICON.

In an aspect, the sodium metal, or sodium metal alloy, may be coated onto a current collector such as copper foil.

In an aspect, the NASICON structure may protect the sodium metal from seawater.

In an aspect, the seawater battery may be further protected with a polymer or resin substance coated around the copper and the sides of the metal and NASICON structure.

In an aspect, the NASICON structure may be coated with a thin protective layer that allows sodium ions to conduct through but keeps water away.

In another example, an interlocking layered membrane is formed onto a porous negative current collector, wherein a hard carbon anode is embedded in the current collector. A schematic illustration of the example is shown in FIG. 11C.

In an aspect, an interlocking layered membrane structure is composed of sodium ion conducting garnet oxide structure.

In an aspect, a porous negative current collector may be composed of copper foam.

In an aspect, a hard carbon anode as the active material may be mixed with a binder and an electrically conductive additive.

In an aspect, the seawater battery may be further protected with a polymer or resin, coated around the outside of the copper foam as well as the sides of garnet oxide structure.

In an aspect, an ionic conducting liquid, or gel polymer, may be added to the hard carbon mixture to further facilitate sodium ion transportation.

In an aspect, the garnet oxide structure may be coated with a thin protective layer that allows sodium ion to conduct through but keeps water away.

Example 9: An Interlocking Layered Membrane in an Anodeless Battery

In an aspect, an interlocking layered membrane may be used in an anodeless secondary battery, wherein a metal, such as lithium metal, is formed between a negative current collector and the layered membrane upon application of a bias.

In an example, an interlocking layered membrane may be sprayed onto a flat current collector, wherein a cathode, coated onto a current collector, is assembled into the battery to form the anodeless battery. A schematic illustration of the example is shown in FIG. 13.

In an aspect, an interlocking layered membrane may be composed of Argyrodite ($Li_6PS_5Cl$) or an Argyrodite with a mixed halogen ratio.

In an aspect, a current collector may include copper foil.

In an aspect, the anodeless membrane may be all solid-state, wherein the cathode, coated on aluminum foil, is a composite cathode composed of an active material, binder, electronically conductive additive, and Argyrodite as the ionic conducting media.

In an aspect, the anodeless membrane may not be an all solid-state, wherein the cathode, coated on aluminum foil, is a conventional cathode composed of an active material, binder, and an electrically conductive additive.

In an aspect, a non all solid-state anodeless battery may contain an ionic conducting liquid, or gel polymer at one or both interfaces of the Argyrodite.

In another example, an interlocking layered membrane may be sprayed onto a cathode, wherein a negative current collector is assembled onto the opposite surface of the layered membrane to form the anodeless structure. A schematic illustration of the example is shown in FIG. 13.

In an aspect, an interlocking layered membrane may be composed of a niobium doped lithium lanthanum zirconium oxide (Nb-LLZO)

In an aspect, the anodeless membrane may be all solid-state, wherein the cathode, coated on aluminum foil, is a composite cathode composed of an active material, binder, electronically conductive additive, and Argyrodite as the ionic conducting media.

Alternatively, the cathode may be composed of a thin active material layer, such as lithium cobalt oxide ($LiCoO_2$) coated onto aluminum foil.

In an aspect, the anodeless membrane may not be an all solid-state, wherein the cathode, coated on aluminum foil, is a conventional cathode composed of an active material, binder, and an electrically conductive additive.

In an aspect, a non all solid-state anodeless battery may contain an ionic conducting liquid, or gel polymer at one or both interfaces of the Nb-LLZO.

Example 10: An Interlocking Layered Membrane in a Flow Type Secondary Battery

In an aspect, an interlocking layered membrane may be used as an ion conducting separator in a lithium flow type, or redox flow type, secondary battery, wherein the layered membrane is used to separate the anolyte and catholyte to prevent crossover.

In an example, an interlocking layered membrane may be freestanding, wherein it is directly assembled into a flow battery to separate the anolyte and catholyte, preventing crossover. A schematic illustration of the example is shown in FIG. 14A.

In an aspect, an interlocking layered membrane may be composed of a doped lithium lanthanum zirconium oxide.

In an aspect, the LLZO membrane may be coated with a thin protective layer that allows lithium ions to conduct through, but not the solvent that forms the anolyte and/or catholyte.

In another example, an interlocking layered membrane may be formed onto a porous negative current collector, wherein the porous negative current collector contains the anode material and anolyte. A schematic illustration of the example is shown in FIG. 14B.

In an aspect, an interlocking layered membrane may be composed of argyrodite ($Li_6PS_5Cl$) or a mixed halogen formulation.

In an aspect, a porous negative current collector may be composed of copper foam.

Alternatively, a porous negative current collector may be composed of aluminum oxide foam, conformally coated with an electrically conductive metal layer.

In an aspect, a negative active electrode material may be conformally coated onto the electrically conductive porous substrate.

In an aspect, a porous negative current collector may be planar or non-planar with a tubular or cylindrical shape In yet another example, an interlocking layered membrane may be formed onto a porous positive current collector, wherein the porous positive current collector contains the cathode material and catholyte. A schematic illustration of the example is shown in FIG. 14C.

In an aspect, an interlocking layered membrane may be composed of NASICON-structured LAGP ($Li_{1-x}Al_xGe_{2-x}(PO_4)_3$).

In an aspect, a porous positive current collector may be composed of aluminum foam.

Alternatively, a porous positive current collector may be composed of aluminum oxide foam, conformally coated with an electrically conductive polymer layer.

In an aspect, a positive active electrode material may be conformally coated onto the electrically conductive porous substrate.

In an aspect, a porous positive current collector may be planar or non-planar with a tubular or cylindrical shape In yet another example, an interlocking layered membrane may be formed onto a lithium metal, or lithium metal alloy, anode surface, wherein the flow battery may be more accurately describe as a hybrid flow battery with no anolyte. A schematic illustration of the example is shown in FIG. 14B.

In an aspect, an interlocking layered membrane may be composed of sulfide solid electrolyte Thio-LISICON LGPS ($Li_{10}GeP_2S_{12}$).

In an aspect, a lithium metal, or lithium metal alloy, anode may be coated onto a current collector, such as stainless steel.

In an aspect, a lithium metal, or lithium metal alloy, anode may be coated with a protective layer to enhance cycling of the flow battery.

Alternatively, a lithium metal, or lithium metal alloy, anode may be coated onto a porous electronically conductive current collector, wherein the voids of the porous collector is filled with an anolyte.

The above described systems and methods can be ascribed to lithium-based secondary batteries such as, but not limited to, lithium-ion batteries, lithium metal batteries, all-solid-state lithium batteries, aqueous batteries, lithium polymer batteries, etc.

The above described systems and methods can be ascribed to secondary batteries with chemistries beyond lithium, which may include sodium ion, aluminum ion, magnesium ion, iron ion, potassium ion, etc.

The above described systems and methods can be ascribed to various secondary battery designs such as, but not limited to, pouch cell, coil cell, button cell, cylindrical cell, prismatic cell, etc.

The above described systems and methods can be ascribed to secondary batteries with the end use applications such as, but not limited to, electric vehicles, hybrid electric vehicles, mobile devices, handheld electronics, consumer electronics, medical, medical wearables, and wearables for portable energy storage.

The above described systems and methods can be ascribed to secondary batteries for grid scale energy storage backup systems.

The above described systems and methods can be ascribed to secondary batteries for longevity, higher energy density and power density and improved safety.

The above described systems and methods can be ascribed for alternative energy storage technologies such as primary batteries, flow batteries, air batteries, and molten salt batteries, wherein the interlocking layered membrane is the main ionic conducting separator.

In the drawings, the following reference numbers are noted:
- 002 Removable supporting substrate
- 004 Interlocking layered membrane thermally sprayed onto removable substrate
- 006 Freestanding interlocking layered membrane
- 008 Interlocking layered membrane thermally sprayed onto a porous substrate
- 010 Porous supporting substrate
- 012 Porous supporting substrate prefilled with a temporary filling material
- 014 Porous supporting substrate prefilled with an active electrode material.
- 016 Interlocking layered membrane thermally sprayed onto a flat substrate surface
- 018 Non electronically conductive substrate
- 020 Electronically conductive substrate
- 022 An interlocking layered membrane sprayed onto a preformed battery electrode
- 024 Preformed active electrode material
- 026 Current collector with preformed active electrode material
- 028 Negative current collector
- 030 Negative secondary battery electrode
- 032 Positive secondary battery electrode
- 034 Positive current collector
- 036 Electrically conductive porous supporting substrate
- 038 Positive secondary battery electrode embedded in a conductive porous substrate
- 040 Negative secondary battery electrode embedded in a conductive porous substrate.
- 042 Secondary battery assembly
- 044 Porous cathode with catalyst
- 046 Oxygen gas
- 048 Electrically conductive porous supporting substrate conformally coated with a catalyst.
- 050 Bias or current applied to system
- 052 Formation of a metal anode
- 054 Negative flow type battery electrode
- 056 Positive flow type battery electrode
- 058 Anolyte
- 060 Catholyte
- 062 Metal or metal alloy anode in a hybrid flow type battery
- 064 Direction an applied electric field.
- 066 Grain boundary vector direction in a conventional solid-state electrolyte membrane.
- 068 Grain boundary vector direction in an interlocking layered membrane.

Although various embodiments and aspects have been shown and described, modifications may occur to those skilled in the art upon reading the specification. The present application includes such modifications and is limited only by the scope of the claims.

What is claimed is:

1. A solid-state electrolyte membrane, comprising:
an interlocking layered microstructure formed by melting and spraying of ionic conductive material, wherein the interlocking layered microstructure comprises multiple layers of the ionic conductive material, wherein layered grain boundaries block the migration of electrons across the membrane suppressing metal dendrite formation in the presence of an electric field.

2. The solid-state electrolyte membrane of claim 1, wherein the interlocking layered structure is composed of at least one of a garnet-structure oxide material, a NASICON-structured material, a perovskite type oxide material, an anti-perovskite-type oxide material, a thiophosphate material, and a argyrodite structured sulfide.

3. A battery, comprising:
a solid anode;
a solid cathode; and
a solid-state electrolyte membrane between the solid anode and the solid cathode, the solid-state electrolyte membrane comprising multiple layers of ionic conductive material having an interlocking layered microstructure, wherein layered grain boundaries block the migration of electrons across the membrane suppressing metal dendrite formation in the presence of an electric field.

4. The battery of claim 3, wherein the solid cathode interacts with ions through an intercalation mechanism, a non-intercalation mechanism, or a combination thereof.

5. The battery of claim 3, wherein the solid anode interacts with ions through an intercalation mechanism, a non-intercalation mechanism, or a combination thereof.

6. The battery of claim 3, wherein the battery is a liquid, gel polymer, all-solid-state, semi-solid-state, a hybrid system, or a combination thereof, that contains the solid-state electrolyte membrane.

7. The battery of claim 3, wherein the battery is a primary or secondary battery that comprises the solid-state electrolyte membrane as an ionic conducting separator.

8. The battery of claim 3, wherein the battery is a flow-type secondary battery, wherein the solid-state electrolyte membrane is used as an ionic conducting membrane.

9. A battery, comprising:
a current collector;
a solid cathode; and
the solid-state electrolyte membrane of claim 1 formed onto the current collector.

10. The solid-state electrolyte membrane of claim 1, wherein the interlocking layered microstructure is coated with a layer to at least one of increase wetting, increase stability, reduce impedance, increase catalytic activity.

11. The solid-state electrolyte membrane of claim 1, whereon a battery electrode, or electrodes is formed onto the surface thereof.

12. The solid-state electrolyte membrane of claim 1, wherein the interlocking layered microstructure is formed onto a porous substrate, and the porous substrate is infiltrated, or decorated with, an electrode material.

13. The solid-state electrolyte membrane of claim 1, wherein the interlocking layered microstructure is formed onto a porous substrate for use as a separation or extraction membrane.

14. The solid-state electrolyte membrane of claim 1, wherein the interlocking layered structure comprises a lithium ionic conductive material.

15. The solid-state electrolyte membrane of claim 1, wherein the interlocking layered structure comprises an amorphous phase.

16. The solid-state electrolyte membrane of claim 1, wherein the interlocking layered structure comprises an amorphous phase in between grains of the interlocking layered microstructure.

17. The battery of claim 3, wherein the interlocking layered structure comprises a lithium ionic conductive material.

18. The battery of claim 3, wherein the interlocking layered structure comprises an amorphous phase.

19. The battery of claim 3, wherein the interlocking layered structure comprises an amorphous phase in between grains of the interlocking layered microstructure.

20. A battery, comprising:

a solid anode on a negative current collector;

a solid cathode on a positive current collector; and a solid-state electrolyte membrane between the solid anode and the solid cathode, the solid-state electrolyte membrane comprising multiple layers of ionic conductive material having an interlocking layered microstructure, wherein an electric field is applied across the solid-state electrolyte membrane, wherein layered grain boundaries block the migration of electrons across the membrane suppressing metal dendrite formation in the presence of the electric field.

* * * * *